(12) United States Patent
Frost et al.

(10) Patent No.: US 9,081,212 B1
(45) Date of Patent: Jul. 14, 2015

(54) COMPONENTIZED EYEWEAR SYSTEMS AND METHODS OF USING THE SAME

(71) Applicant: Swapz, LLC, Burke, VA (US)

(72) Inventors: Curtis V Frost, Burke, VA (US); Nancy Armstrong-Frost, Burke, VA (US); Robert Harris, Burke, VA (US); Sherry Harris, Burke, VA (US); Steve Michael Moran, Woodland Hills, CA (US); Amy Moran, Woodland Hills, CA (US)

(73) Assignee: Swapz, LLC, Burke, VA (US)

( * ) Notice: Subject to any disclaimer, the term of this patent is extended or adjusted under 35 U.S.C. 154(b) by 199 days.

(21) Appl. No.: 13/676,302

(22) Filed: Nov. 14, 2012

Related U.S. Application Data

(60) Provisional application No. 61/559,832, filed on Nov. 15, 2011.

(51) Int. Cl.
| | |
|---|---|
| *G02C 11/02* | (2006.01) |
| *G02C 1/00* | (2006.01) |
| *G02C 5/14* | (2006.01) |
| *G02C 5/22* | (2006.01) |

(52) U.S. Cl.
CPC *G02C 11/02* (2013.01); *G02C 1/10* (2013.01); *G02C 5/14* (2013.01); *G02C 5/22* (2013.01)

(58) Field of Classification Search
CPC ..... G02C 11/02; G02C 11/04; G02C 2200/02
USPC ........................ 351/52, 51, 122, 123, 41, 158
See application file for complete search history.

(56) References Cited

U.S. PATENT DOCUMENTS

| | | | | |
|---|---|---|---|---|
| 2,502,734 | A | * | 4/1950 | Lyons ........................... 351/122 |
| 3,021,753 | A | * | 2/1962 | Vinson .......................... 351/52 |
| 3,526,450 | A | * | 9/1970 | Berry ............................. 351/52 |
| 3,801,189 | A | * | 4/1974 | Bolle .............................. 351/92 |
| 3,993,403 | A | * | 11/1976 | Brown .......................... 351/178 |
| 4,045,131 | A | | 8/1977 | Sherman |
| 4,786,158 | A | * | 11/1988 | Barfus-Shanks et al. ...... 351/122 |
| 4,958,923 | A | * | 9/1990 | Rosenson ....................... 351/52 |
| 4,986,647 | A | | 1/1991 | Blumenthal |
| 5,181,051 | A | * | 1/1993 | Townsend et al. .............. 351/52 |
| 5,185,620 | A | * | 2/1993 | Cooper ........................... 351/52 |
| D341,609 | S | * | 11/1993 | Lloyd .......................... D16/335 |
| 5,371,554 | A | | 12/1994 | Aspesi |
| 5,652,637 | A | | 7/1997 | Marini |
| 6,036,310 | A | * | 3/2000 | Moetteli ....................... 351/118 |
| 6,102,540 | A | | 8/2000 | Chen |
| 6,568,840 | B1 | | 5/2003 | Mabe et al. |
| 6,582,075 | B1 | | 6/2003 | Swab |

(Continued)

Primary Examiner — Hung Dang
(74) Attorney, Agent, or Firm — John E. Boyd; FisherBroyles, LLP

(57) ABSTRACT

A componentized eyeglass/sunglasses/slipcover system (System) that facilitates the quick and easy transformation of the eyeglasses for decorative/style changes and/or the attachment of electronic or other integrated components. The System will comprise of a faceplate assembly consisting of two or more pieces plus one or two lenses, two ear piece members and two hinges which attach and detach from either or both the face plate assembly and the ear piece members and slipcovers that are made of any flexible material plastic or other material that will cover all or a portion of the ear piece members and/or the face plate assembly. The componentized system is for decorative/style changes as well as for attaching/integrating electronic or other components. The System fits together in a clean, secure manner to present a sleek, quality appearance.

18 Claims, 22 Drawing Sheets

(56) References Cited

U.S. PATENT DOCUMENTS

| | | |
|---|---|---|
| 6,834,952 B2 | 12/2004 | Polovin |
| 6,957,890 B2 | 10/2005 | Shapiro |
| 7,520,604 B2 | 4/2009 | Choi |
| 7,524,057 B2 | 4/2009 | Agazarova |
| 7,553,014 B2 | 6/2009 | Yang |
| 7,559,644 B1 | 7/2009 | Lloyd |
| 7,677,721 B2 | 3/2010 | Siu |
| 7,677,722 B1 | 3/2010 | Mednick |
| 7,874,669 B2 | 1/2011 | Moritz |
| 7,891,807 B2 | 2/2011 | Mansuy |
| 7,896,490 B1 | 3/2011 | Chen |
| 7,922,320 B1 | 4/2011 | Tsai |
| 7,922,321 B2 | 4/2011 | Howell et al. |
| 7,954,942 B2 | 6/2011 | Calilung et al. |
| 7,997,724 B1 | 8/2011 | Hsu |
| 8,020,989 B2 | 9/2011 | Jannard et al. |
| 2010/0265453 A1* | 10/2010 | Lampru .......................... 351/52 |
| 2011/0051074 A1* | 3/2011 | Arnell ............................ 351/47 |

* cited by examiner

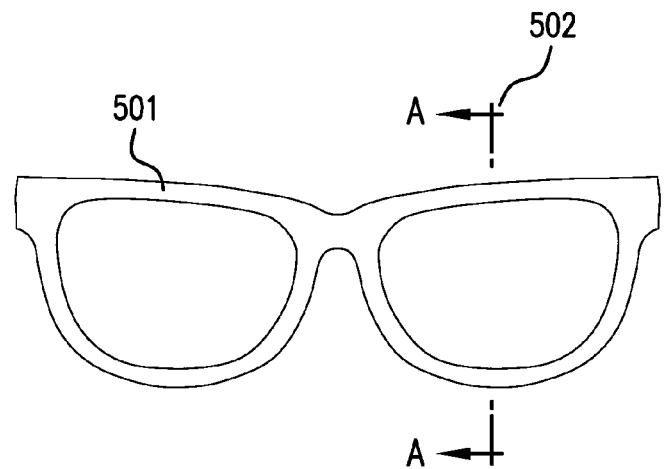
FIG.5A
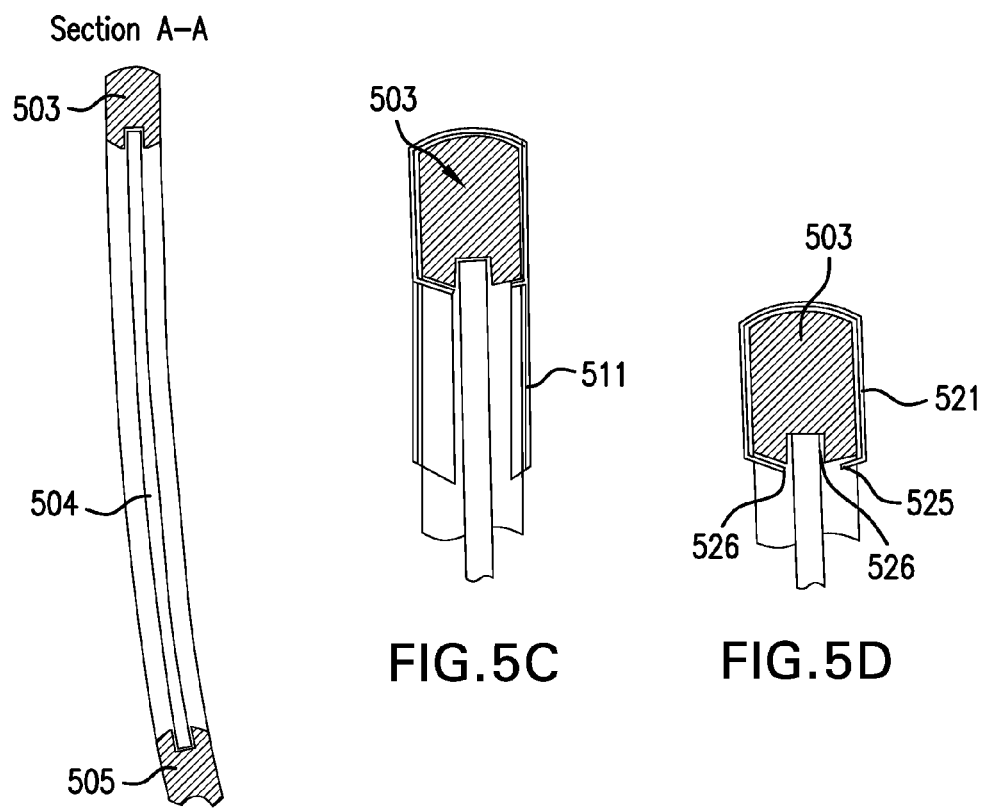
FIG.5B
FIG.5C
FIG.5D

COMPONENTIZED EYEWEAR SYSTEMS AND METHODS OF USING THE SAME

RELATED APPLICATIONS

This application claimed priority to U.S. Provisional Application No. 61/559,832, filed Nov. 15, 2011, hereby incorporated by reference.

BACKGROUND OF THE INVENTION

1. Field of the Invention

The invention relates generally to eyewear systems capable of changing appearance or otherwise being decorated or equipped with electronic or functionality components. More specifically, the invention facilitates quick and easy transformation of eyewear for decorative, appearance or style changes and/or for the attachment of electronic or other integrated components.

2. Description of the Related Art

Currently in the eyeglass industry, an individual can choose eyeglasses from a variety of designs, colors, components, and other features. The current industry has a myriad of singular eyeglass designs, however, these designs typically do not allow for the quick and easy transformation of the appearance of the eyeglass frame for a unique, individual style. The individual wearer usually can only choose frames created by the eyeglass designer but cannot design his or her own eyeglass frame and make easy modifications or changes after purchase.

SUMMARY OF THE INVENTION

The present invention relates to innovative eyewear or eyeglass products and methods of using the same allowing users to easily customize eyewear to a desired appearance or design and/or attach electronic or other components to the eyewear. Preferred embodiments of the invention allow the individual to personalize his or her componentized eyeglasses easily and with their unique style perspective and to be able to easily modify the appearance, design or functionality of the eyewear when desired.

Thus, the invention provides eyewear that can be uniquely, repeatedly and/or reversibly modified based on an individual's style preferences or needs.

One aspect of the invention relates to eyewear systems including improved hinge assemblies to releasably attach the templates arms to the faceplate.

Another aspect of the invention relates to innovative slipcovers that can be employed to decorate or change the appearance of eyewear components and/or add electronic components or other functionality to eyewear systems including eyewear systems of all shapes, sizes, and materials (e.g., wire, plastic, rubber, metal, bamboo . . . ).

Yet another aspect of the invention relates to novel eyewear systems allowing for easy lens changes whereby the left lens and right lens can be reversibly replaced by the wearer to change the appearance or functionality of the lens.

A still further aspect of the invention relates to improved nose bridge fasteners that allow for releasably connecting the left side and right side of the face plate, specifically releasably attaching the left lens holder and the right lens holder.

A still further aspect of the invention relates to eyewear systems including electronic or other functional components that can be attached or re-attached in any combination.

A still further aspect of the invention relates to innovative slipcovers made of any flexible material i.e. stretchy soft rubber, plastic, metal, bamboo, or any combination thereof.

A still further aspect of the invention relates to eyewear systems including two or more of the above-identified aspects of the invention in combination.

The foregoing has outlined some of the aspects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

The unique features characteristic of this invention and operation will be understood more easily with the description and drawings. It is to be understood that the drawings are for illustration and description but does not define the limits of the invention.

BRIEF DESCRIPTION OF THE DRAWINGS

The above mentioned and other features of the inventions disclosed herein are described below with reference to the drawings of the preferred embodiments. The illustrated embodiments are intended to illustrate, but not to limit the inventions. The drawings contain the following figures:

FIG. 5A is a front view of a faceplate indicating a section A-A cutaway view.

FIG. 5B is a side cross-sectional view along line A-A of the faceplate FIG. 5A.

FIG. 5C is a blow-up side view of a mid-length slipcover over the top of the faceplate frame only.

FIG. 5D is a blow-up side view of a short slipcover over the top of the faceplate only showing the slipcover snapping over the top of the frame.

DETAILED DESCRIPTION OF THE INVENTION

Figure 1A:
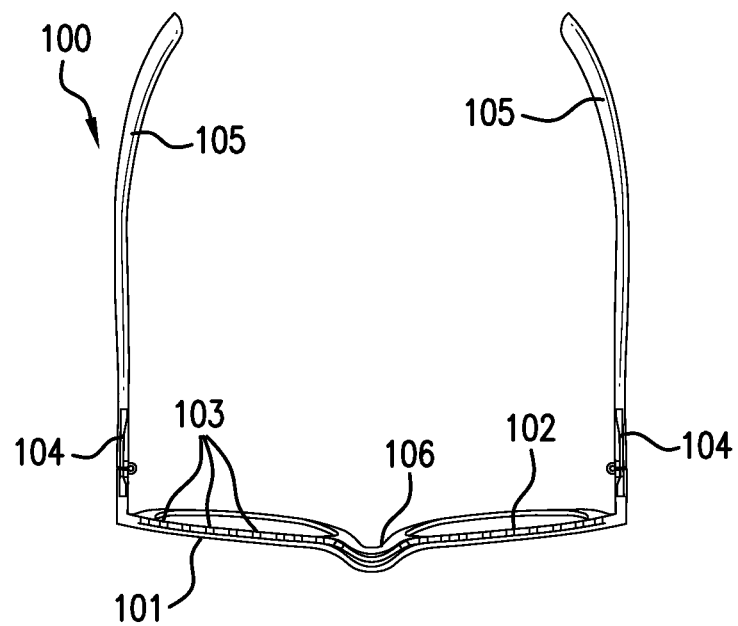
FIG. 1A is a top view of an assembled eyewear system including a faceplate assembly, arms and reversibly connecting hinges and visible dovetail grooves along the top of the faceplate frame.

While the present description sets forth specific details of various embodiments, it will be noted that the description is illustrative only and should not be construed in any way as limiting. This description may set forth examples of embodiments incorporating certain aesthetic or functional components, the present inventions contemplate the use of any type of present or future decorative or functional (e.g. electronic or other) components with eyeglasses. Further, the interchangeability and customization of embodiments can be permanent or temporary. Furthermore, one or more components can be integrated into visible or hidden portions of the eyeglasses. For example, a component may be attached to either the inner or outer face of an earpiece or faceplate of the eyeglasses.

As noted above, the eyewear designs have been provided to enable the individual to personalize his or her eyeglasses easily and with their unique style perspective or functionality. Embodiments disclosed herein demonstrate that an eyewear product can be provided that enables a wearer to selectively modify or personalize their eyeglasses to comprise any variety of decorative and/or electronic or other components. Further, in accordance with another aspect of the embodiments disclosed herein is the realization that a wearer should preferably be able to easily modify their eyeglasses and obtain desirable results.

In this regard, it is contemplated that any aesthetic or functional modifications to the eyeglasses preferably do not affect the stability or optical quality of the eyeglasses. For example, a component preferably is not only easily incorporated into the eyeglasses, but is preferably securely retained by the eyeglasses. Therefore, in order to address such concerns, as well as other disadvantages of the prior art, the present application sets forth various embodiments and disclosure relating to a customizable eyeglass that allows a wearer to modify at least one aesthetic and/or functional quality thereof while maintaining superior performance and fit of the eyeglasses.

In some embodiments, a wearer can remove and replace decorative features of the eyeglasses. In some implementations, the wearer can remove and replace minor or major parts of the faceplate and/or earpieces. For example, the wearer can remove and replace slipcovers along one or more of the earpieces and/or the faceplate. In this manner, the wearer is given the ability to personalize the appearance and character of their eyeglasses.

In yet other embodiments, a uniquely configured eyeglass is provided that enables one or more decorative and/or electronic or other components.

In yet other embodiments, uniquely configured eyeglasses are provided that enables one or more decorative or electronic/other components to be removably mounted onto one or more sections of the eyeglasses. The eyeglasses can comprise a faceplate, a pair of earpieces, a nose bridge and one or more attachments, engagement sections or zones that can be used to secure decorative or electronic/other components to the eyeglasses. The attachment portion can be stationary or movable relative to the eyeglasses. The attachment portion can be disposed on the frame or the earpieces of the eyeglasses.

For example, the faceplate element can be fastened to the front frame. One or more portions of the earpiece can be mounted on the faceplate. In such an embodiment additional components can be mounted onto the faceplate or earpieces.

Figure 1B:
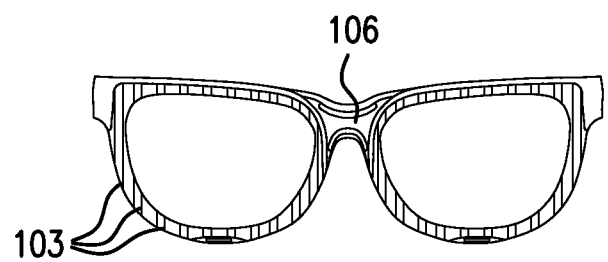
FIG. 1B is a front view of an assembled eyewear system (with the dove-tail back ribs visible).
Figure 1C:
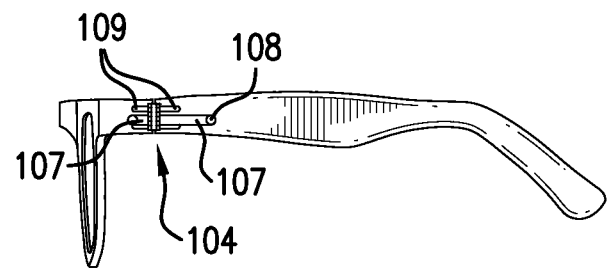
FIG. 1C is a side view of an assembled eyewear system including a faceplate assembly, arms and visible reversibly connecting hinges.

In another embodiment, a component can be seated onto the faceplate for mounting thereon. The faceplate can comprise of one or more engagement structures, such as grooves or hinges that can interact with corresponding engagement structures of the component when the component is initially seated onto the faceplate in order to retain the component thereon. Thus, the component can be securely mounted on the earpiece when the eyeglasses are worn. FIG. 1A shows a top view of an eyewear system 100 including front faceplate 101 and rear lens covers 102 connected via dove-tail grooves 103. Eyewear system 100 also includes hinges 104 connecting arms 105 to faceplate 101 and nose bridge 106. FIG. 1B is a front view of eyewear system 100 illustrating the rib-like appearance of the interconnecting dovetail grooves 103. FIG. 1C is a side view of eyewear system 100 showing hinge 104 with releasably connecting structures including an elongated member 107 with locking element 108 and support members 109.

Thus, the invention relates to a componentized eyeglass/sunglasses/slipcover system (herein "System") that can facilitate the quick and easy transformation of eyeglasses for decorative/style changes and/or the attachment of electronic or other integrated components.

According to alternative embodiments of the invention, the eyewear system 100 includes one-sided hinges (not shown) detachably connecting to arm 105 or faceplate 101, while being permanently connected to the other component. For example, a one-sided hinge attached using screws to faceplate 101 but including releasably connecting structures including an elongated member 107 with locking element 108 and support members 109 for releasably connecting to arm 105.

According to yet another embodiment, the number of dove-tail grooves 103 are reduced (e.g., preferably 2-4 grooves per side) or replaced with other attachment mechanisms or means (e.g., clips, Velco, adhesive, screws, pins, etc.).

Figure 2A:
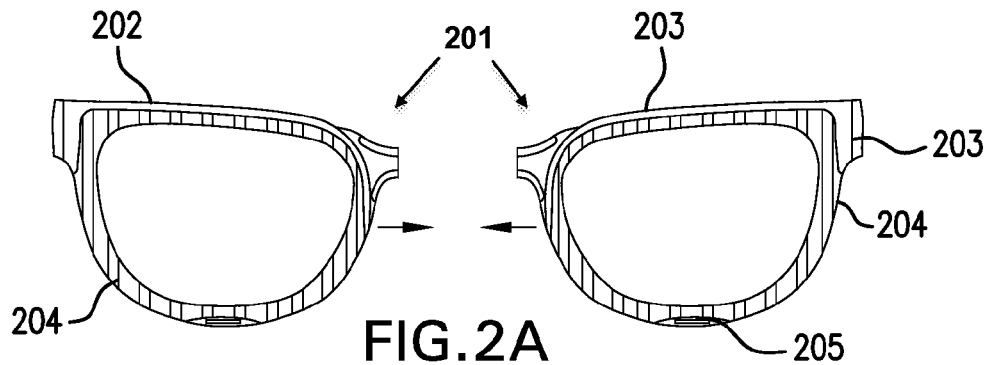
FIG. 2A is a back view of a pre-assembled two-piece faceplate (left-side and right-side) showing connecting dovetail back ribs or grooves.
Figure 2B:
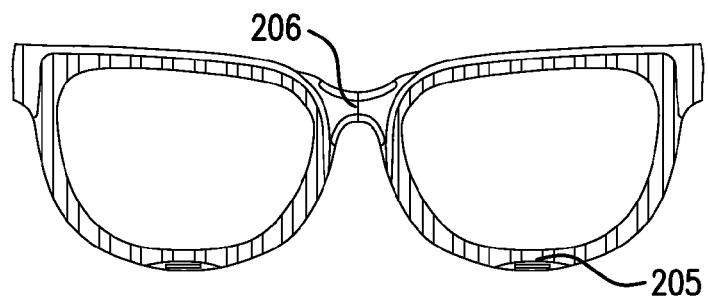
FIG. 2B is a back view of an assembled faceplate without lens with nose bridge in place.
Figure 2C:
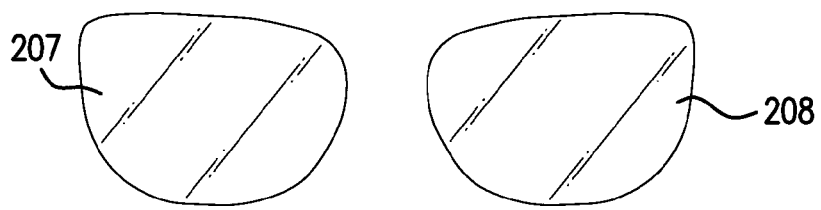
FIG. 2C is a back view of unassembled left side and right side drop-in lens.
Figure 2D:
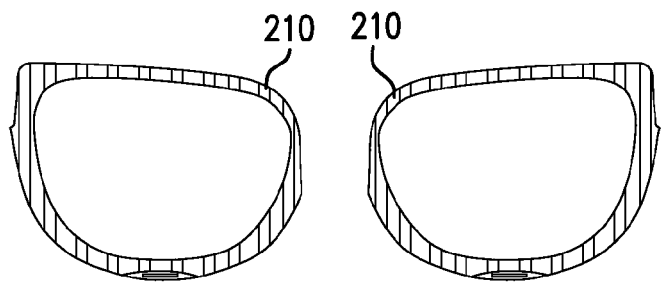
FIG. 2D is a back view of pre-assembled back-lens covers.
Figure 2E:
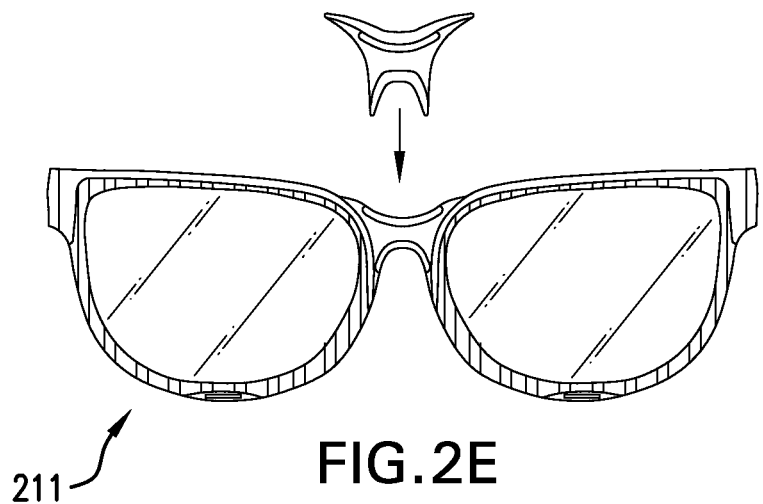
FIGS. 2E and 2F are back views of a fully assembled faceplate.
Figure 2F:
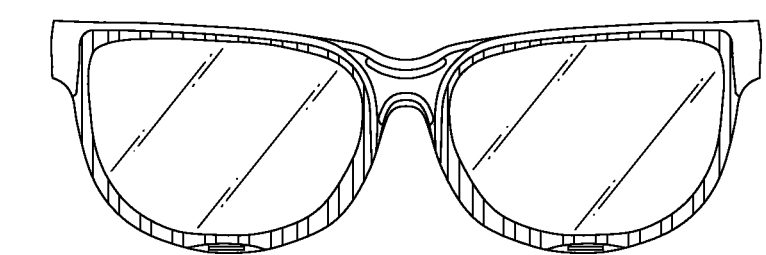
Figure 2G:
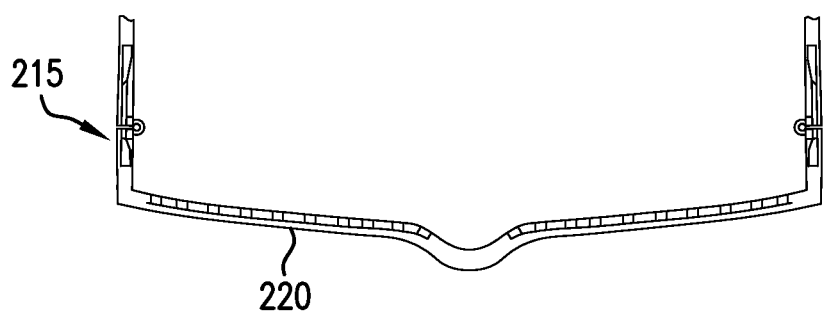
FIG. 2G is a top-view of assembled eyewear.
Figure 2H:
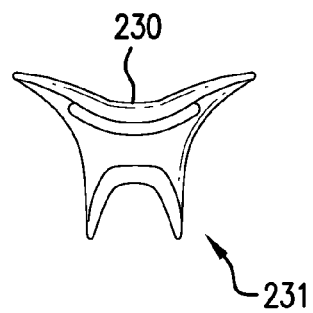
FIG. 2H is a front-view of nose fastener with visible internal connecting channels that may be snapped onto faceplate frame and easily removed.
Figure 2I:
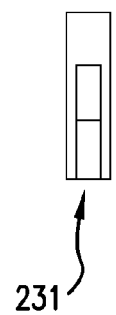
FIG. 2I is a side view of nose fastener with connecting channels shown.
Figure 2J:
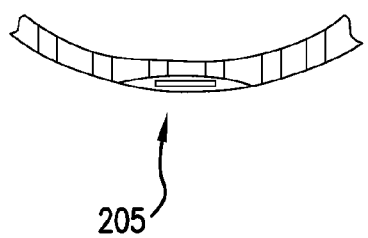
FIG. 2J is an exploded view of portion of faceplate illustrating removal notch adapted to facilitate removal of a lens.
Figure 2K:
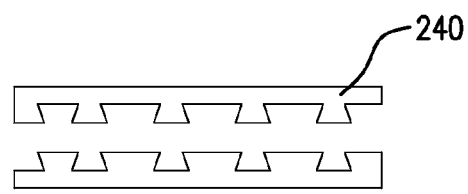
FIG. 2K is a top view showing the interconnecting surfaces with visible dovetail grooves on the unassembled faceplate and the back lens covers.
Figure 2M:
FIG. 2M is a top view of nose fastener assembling a faceplate.
Figure 2L:
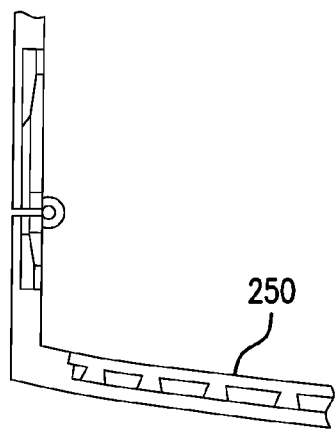
FIG. 2L is a top view with partially visible dove-tail groove interconnecting surfaces of an assembled faceplate and back lens covers demonstrating how the front faceplate hides/covers the connecting surfaces when viewed from the top or front.
Figure 2N:
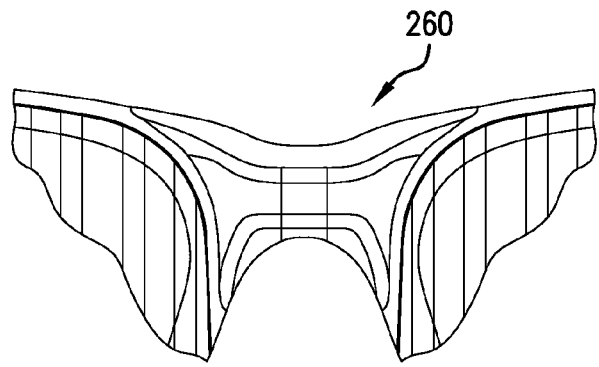
FIG. 2N is a front view of nose fastener assembling a faceplate that may be used to increase the width of the faceplate assembly to accommodate wider heads and/or alter the appearance or design of the eyewear.

FIG. 2A is a back view of a pre-assembled two-piece faceplate 201 including a left-side 202 and right-side 203 showing connecting dovetail back ribs or grooves 204 and notch 205. FIG. 2B is a back view of an assembled faceplate 206 formed by connecting left-side 202 and right-side 203 with bridge fastener 206. FIG. 2C is a back view of unassembled left-side 207 and right-side 208 drop-in lens. FIG. 2D is a back view of pre-assembled back-lens covers 210. FIGS. 2E and 2F are back views of a fully assembled faceplate 211. FIG. 2G is a top-view of assembled eyewear 215 showing connecting dovetail grooves 220. FIG. 2H is a front-view of nose fastener 230 having a tooth-like or butterfly-like shape with visible internal connecting channels 231 that may be snapped onto faceplate frame and easily removed. FIG. 2I is a side view of nose fastener with connecting channels shown 231. FIG. 2J is an exploded view of portion of faceplate illustrating removal notch 205 adapted to facilitate removal of a lens. FIG. 2K is a top view showing the interconnecting surfaces 240 with visible dovetail grooves on the unassembled faceplate and the back lens covers. FIG. 2L is a top view with partially visible dove-tail groove interconnecting surfaces 250 of an assembled faceplate and back lens covers demonstrating how the front faceplate hides/covers the connecting surfaces when viewed from the top or front. FIG. 2M is a top view of nose fastener 260 assembling a faceplate. FIG. 2N is a front view of nose fastener 260 assembling a faceplate that may be used to increase the width of the faceplate assembly to accommodate wider heads and/or alter the appearance or design of the eyewear.

One aspect of the invention relates to slipcovers adapted to decorate or change the appearance of one or more components on eyewear.

According to one preferred embodiment, the eyewear system ("System") may comprise of a faceplate assembly, preferably consisting of two or more pieces, plus one or two lenses, two ear piece members or arms and two hinges which attach and detach from both the face plate assembly and the earpieces. The earpiece members and slipcovers are preferably made of any flexible material plastic or other material that will cover all or a portion of the earpiece members and/or the faceplate assembly. The componentized system is for decorative/style changes as well as for attaching/integrating electronic or other components. The System fits together in a clean, secure manner to present a sleek, quality appearance.

The System can facilitate the quick and easy transformation of the eyeglasses for decorative/style changes and the attachment of electronic or other integrated components.

According to one preferred embodiment, the System comprises: (i) a face plate assembly consisting of two or more pieces, (ii) one or two lenses, (iii) two ear piece members and (iv) two hinges which attach and detach from both the face plate assembly and the ear piece members. Preferably, further comprising slipcovers that are preferably made of flexible material (plastic, metallic or otherwise) that will cover all or a portion of the earpiece members and/or the faceplate assembly. Preferably the faceplate assembly is comprised of a front and back cover, one or more lenses between said front and back covers. Preferably, the faceplate assembly and earpiece are connected to the hinge so that the earpieces are moveable and can be opened and/or closed. Alternatively, a one-sided hinge is attached or secured to either the faceplate or earpiece arm (e.g., using screws) and releasably attached to the other component (e.g., earpiece arm or faceplate) allowing one side of the hinge to be releasably connected to facilitate interchanging the components, while the other side is securely attached.

According to one preferred embodiment, the faceplate assembly can be comprised of a front and back cover and one or more lenses, wherein the front cover and one or more lenses fit together and the back cover slides into place securing the faceplate assembly which is also easily removable. Preferably, the system comprises means for reversibly slipcovering eyewear components including the faceplate and/or earpieces.

According to another preferred embodiment, the nose bridge can become a fastener that slides onto grooves of the faceplate covers and locks onto them easily and securely into place, while the nose bridge is also easily removable. Preferably, the eyewear includes an earpiece system wherein a movable portion can be configured with the hinge to detach from the static portion for easy decorative, electronic or other component replacements. Preferably, the hinge system can attach securely and can be easily removed from both the faceplate assembly and the earpieces. Additionally, the hinge can attach securely and can be easily removed from both the faceplate assembly and the earpieces.

The slipcovers can be made of any flexible material (plastic, metallic or other material) that will cover all or a portion of the earpiece members and/or the faceplate assembly. According to the invention, the slipcovers may be used for decorative/style changes as well as for attaching/integrating electronic or other components.

Figure 4A:
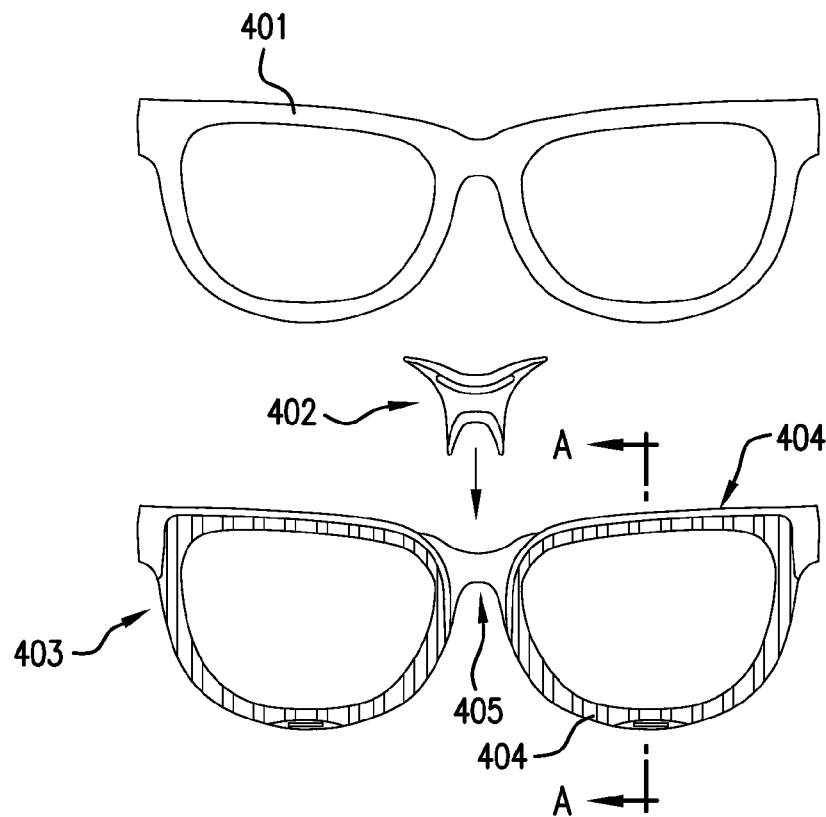
FIG. 4A shows a back view of a full faceplate slipcover, a back view of a pre-assembled nose bridge fastener position to snap onto a faceplate and a back view of a front faceplate showing the dovetail grooves or back ribs and assembled nose bridge fastener.

FIG. 4A shows back views of a full faceplate slipcover 401, a pre-assembled nose bridge fastener 402 positioned to snap onto front faceplate 403 showing the dovetail grooves or back ribs 404 and assembled nose bridge fastener 405.

Figure 4B:
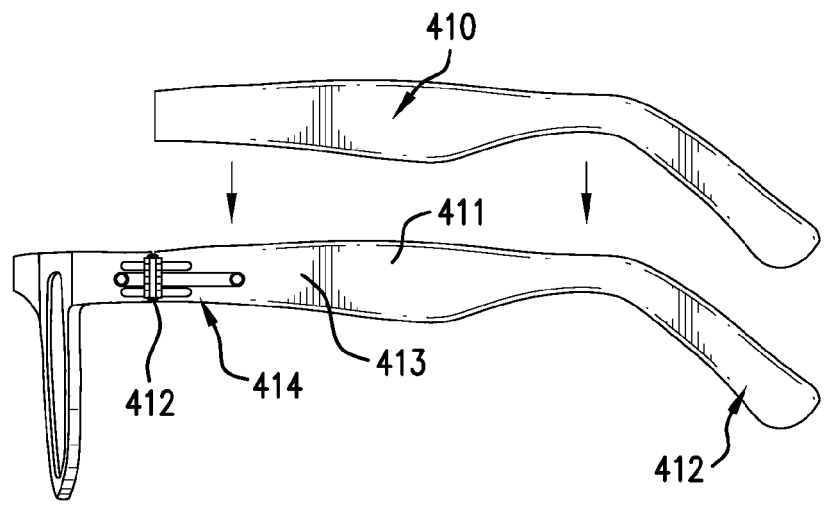
FIG. 4B is a side view of a side arm slipcover positioned above a side view of an assembled eyewear system with a visible connecting hinge.

FIG. 4B shows side views of a side arm slipcover 410 positioned to cover arm 411 of assembled eyewear system 413 with a visible connecting hinge 414.

Figure 4C:
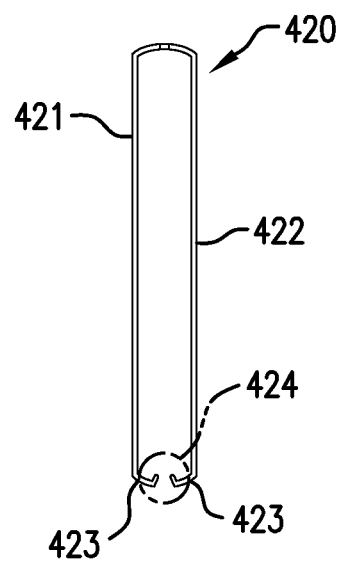
FIG. 4C is an end view the side arm slipcover.

FIG. 4C is an end view the side arm slipcover 420 showing walls 421 and 422 with inwardly facing engaging or gripping portions 423 with locking elements 424.

Figure 4D:
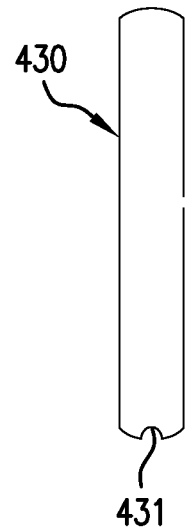
FIG. 4D is an end view of a side arm.

FIG. 4D is an end view of a side arm 430 showing engaging notch or channel 431.

Figure 4E:
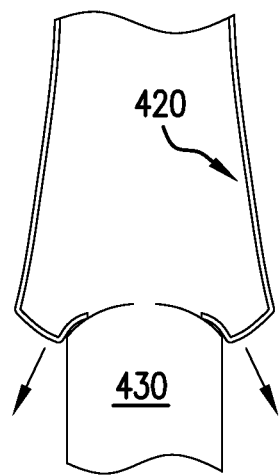
FIG. 4E is a side view of a slipcover sliding over the top of the same.

FIG. 4E is a side view of a slipcover 420 sliding over the top of arm 430.

Figure 4F:
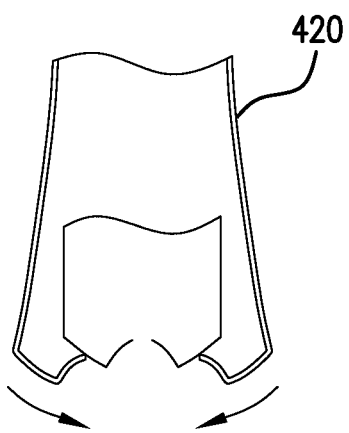
FIG. 4F is a side view of the slipcover snapping closed over a bottom grove of the arm showing how the slipcover mates to the arm.

FIG. 4F is a side view of the slipcover 420 snapping closed over a bottom grove 431 of arm 430 showing how the slipcover mates to the arm with engaging or gripping portions 423 closing to releasably secure slipcover 420 onto arm 430 with reversibly locking elements 424 positioned to lock into engaging notch or channel 431.

Figure 4G:
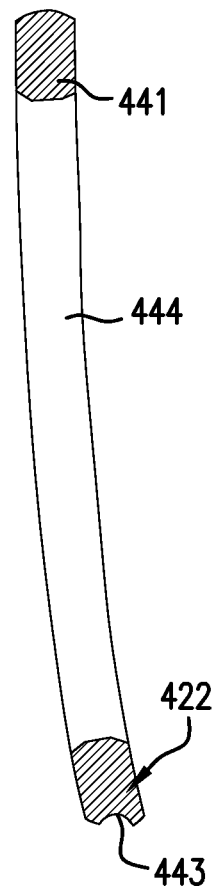
FIG. 4G is a section A-A cutaway side view of the faceplate of FIG. 4A.

FIG. 4G is a section A-A cutaway cross-sectional side view of the faceplate of FIG. 4A showing faceplate top frame 441 and bottom frame 442 with engaging grove 443 and lens 444.

Figure 4H:
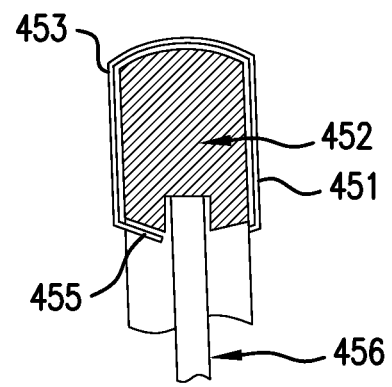
FIG. 4H is a side view of the faceplate slipcover snapping onto a top portion of the faceplate showing how the slipcover mates to the faceplate.

FIG. 4H is a side view of the faceplate slipcover 451 snapping onto a top frame 452 of an eyewear system faceplate 453 showing lens 456 and faceplate slipcover 451 mating to top frame 452 and releasably locking onto engaging bottom 455.

Figure 4I:
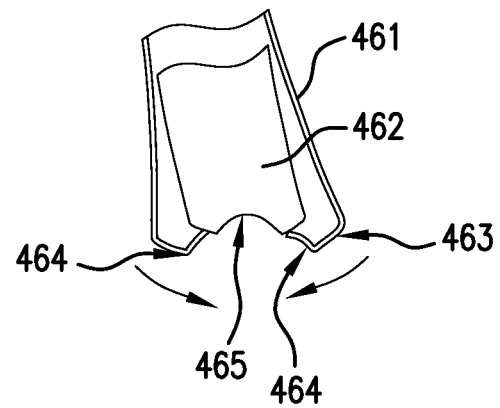
FIG. 4I is a side view of the faceplate slipcover snapping onto a bottom portion of the faceplate showing how the slipcover mates to the faceplate.

FIG. 4I is a side view of the faceplate slipcover 461 snapping onto a bottom portion of the faceplate 462 showing how the slipcover mates to the faceplate with engaging or gripping portions 463 closing to releasably secure slipcover 461 onto faceplate 462 with reversibly locking elements 464 positioned to lock into engaging notch or channel 465.

FIGS. 4E-I demonstrate slipcover systems that can attach to the earpiece arms or faceplate frames by snapping onto the groove running along the bottom or inside edge of the eyewear component. As shown in FIG. 4F, for example, the slipcover flexes over the top of the arm and slides over or around it and securing in the groove or bottom. Additionally, the earpiece slipcovers can easily be removed.

FIG. 5A is a front view of a faceplate 501 indicating a section A-A cutaway view 502.

FIG. 5B is a side cross-sectional view along line A-A of the faceplate FIG. 5A showing top frame portion 503, lens 504 and bottom frame portion 505. FIG. 5C is a blow-up side view of a mid-length slipcover 511 over top frame portion 503. FIG. 5D is a blow-up side view of a short slipcover 521 snapped onto top frame portion 503 with engaging or gripping portions 525 closing to releasably secure slipcover 521 by reversibly locking onto the bottom 526 of top frame portion 503.

Additionally, preferably the faceplate slipcovers can easily be removed. The slipcover system can be for decorative/style changes as well as for attaching/integrating electronic or other components. The slipcover system can fit together in a clean, secure manner to present a sleek, quality appearance.

According to alternative embodiments, covers other than U-shape slipcovers are used.

According to one embodiment, the cover is a flexible material (e.g., rubber) that can be releasably attached to the eyewear component. For example, a flexible tube-like or sock-like slipcover may be threaded over the earpiece arm. This allows the covers to be used with wire frame eyewear where the thin arms do not provide sufficient width for other designs or where a single slipcover, because of its elastic or flexible nature, can fit over and secure to and be removed from a variety of different shaped eyewear components.

According to another embodiment, the cover attaches to the component via a male/female connector, for example, the mechanism shown in U.S. Pat. No. 6,438,811, hereby incorporated by reference. According to another embodiment, either the component and/or cover comprises snap connectors, for example, the mechanisms described in U.S. Pat. No. 5,797,696 to Baynes, et al., US 2004/0151539 to Sikora et al.; and U.S. Pat. No. 3,497,908 to Zamarra et al., hereby incorporated by reference.

Figure 6:
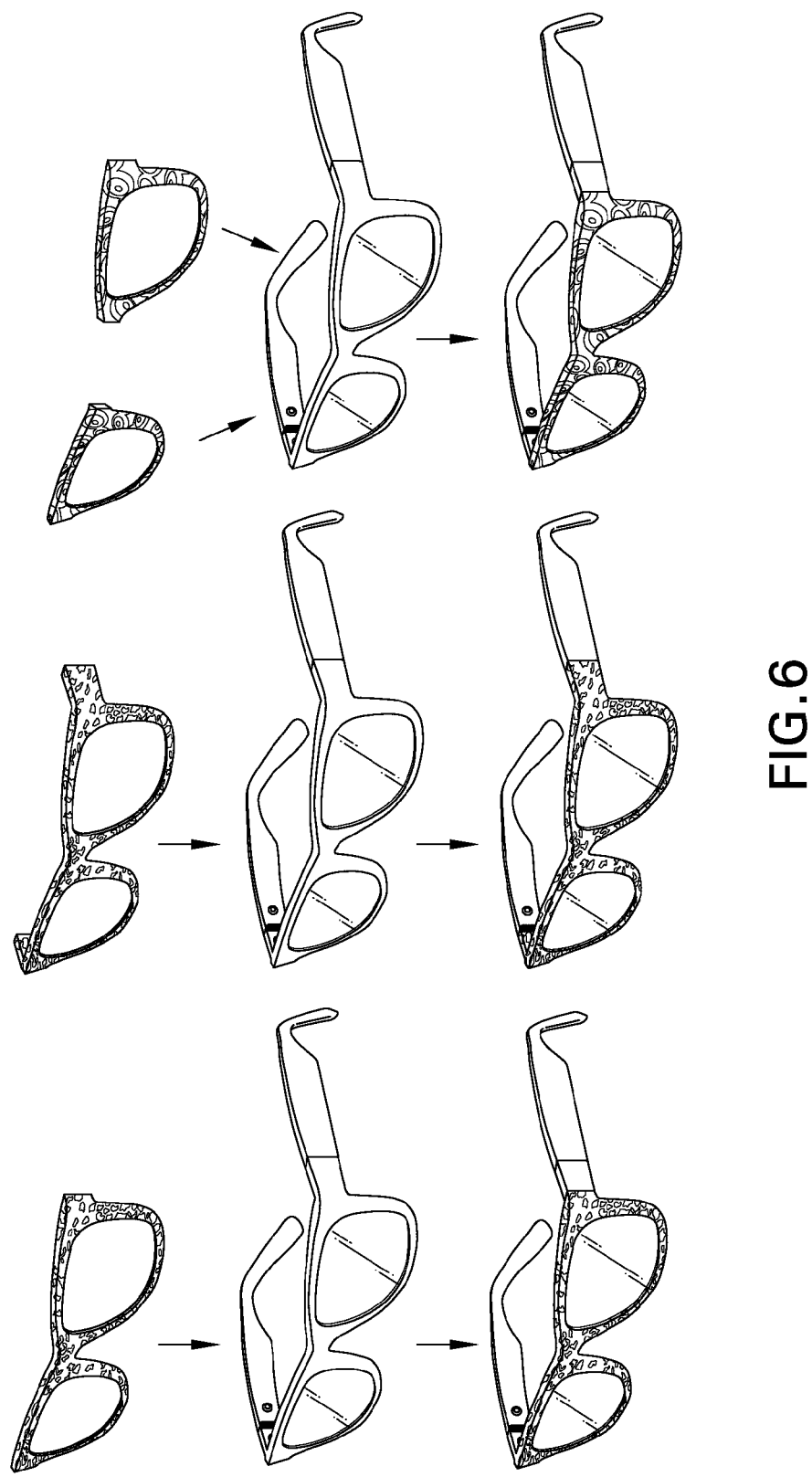
FIG. 6 provides different embodiments of faceplate slipcovers to include full, wrap around and split.
Figure 7:
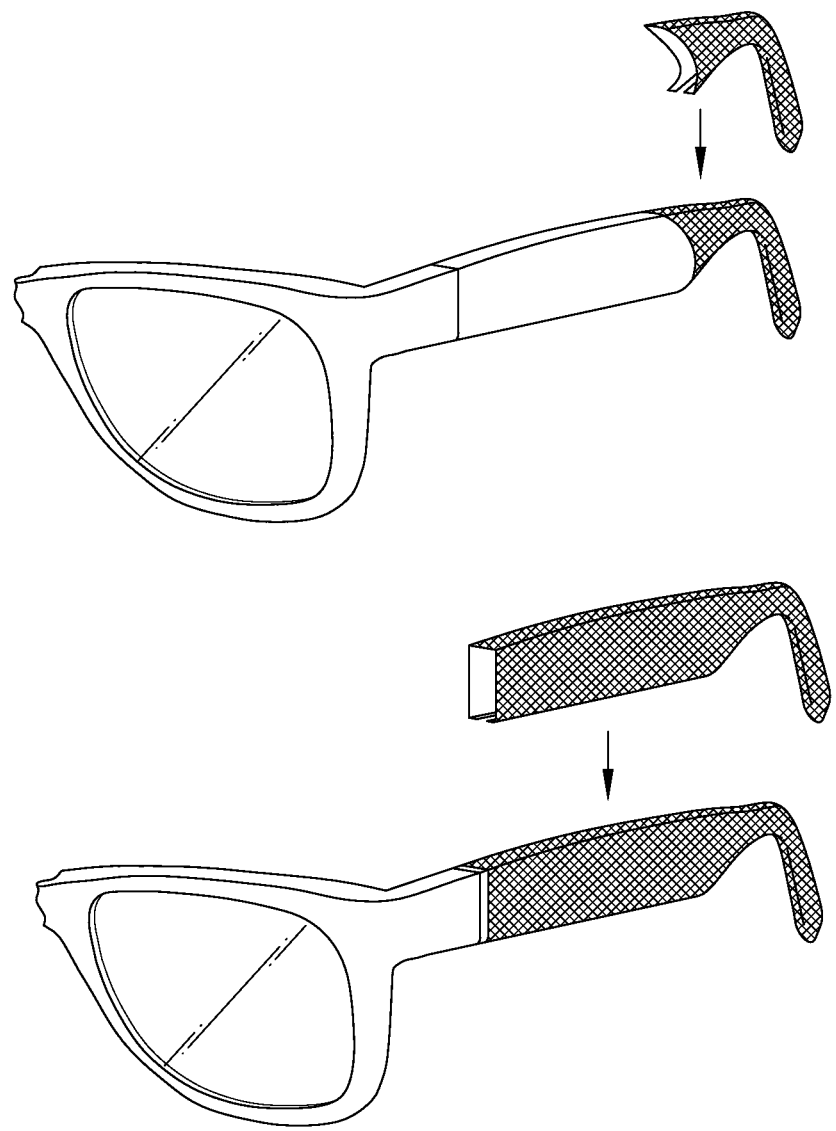
FIG. 7 provides multiple embodiments of the earpiece slipcovers partially covering the length of the arm.
Figure 8:
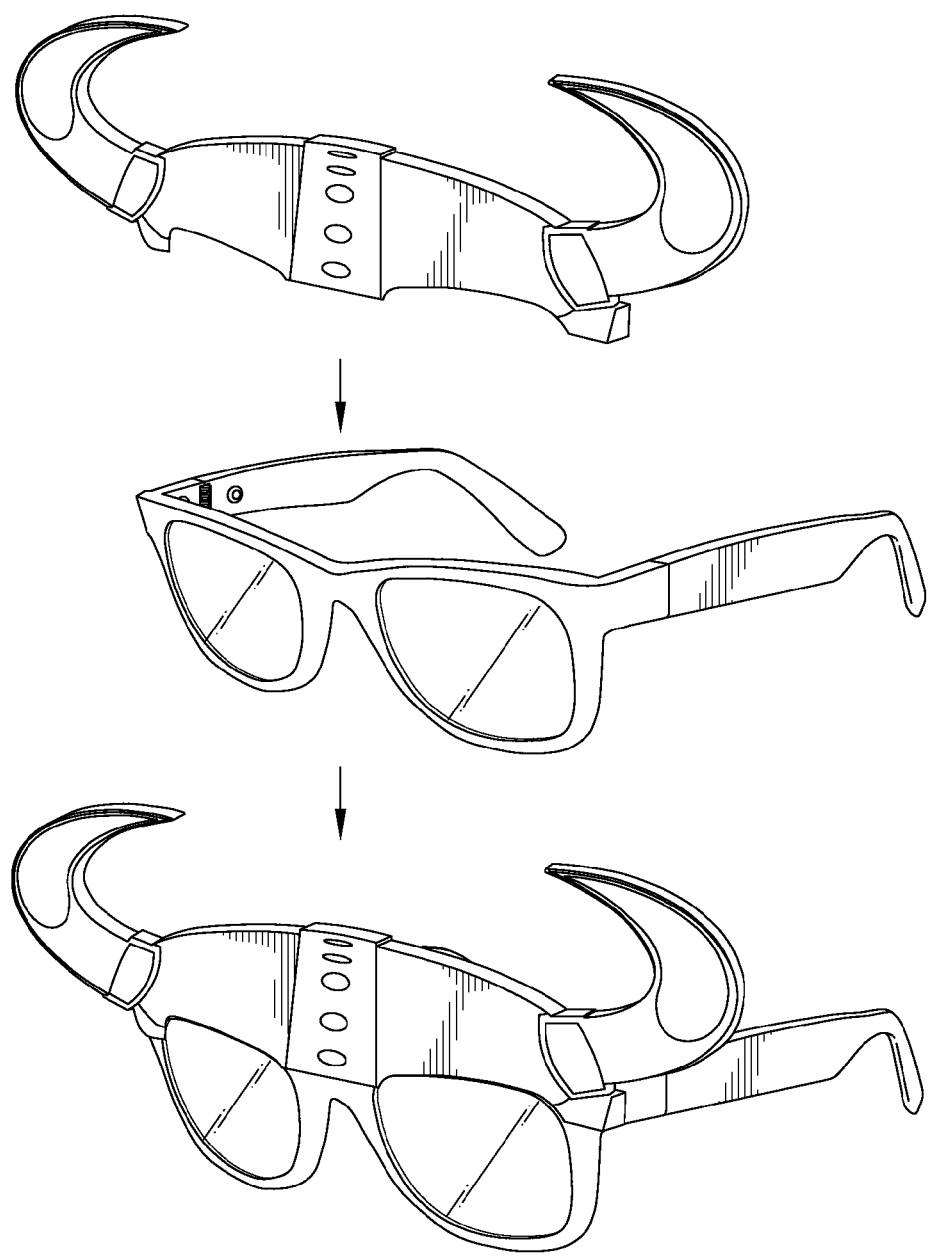
FIG. 8 provides embodiments of sculpted theme slipcovers employing the snap-on design of the invention.

According to preferred embodiments of the invention, the slipcovers that are for decorative color changes where the intent is not to change the overall shape of the faceplate or earpieces are as thin as possible when balanced with the requirement to be installed and removed over and over again without losing their custom shape, as shown in FIG. 6. Preferably, the slipcover retains the same shape as the underlying component it covers. Alternatively, the slipcover alters the shape. For example, a faceplate slipcover may change the shape or design of the faceplate. As shown in FIG. 8, sculpted theme and attachment slip covers may be used where the intent is to change the shape of the faceplate/earpiece. Preferably, the slip cover will be slightly thicker to provide the rigidity and support based on the size of the sculpted theme or attachment while still being flexible enough to be easily attached and removed. The internal surface of the slipcovers are custom molded to fit exactly and snuggly around the faceplate/earpiece outer surface. Strength, flexibility and weight may be optimized for a specific slipcover use.

According to other embodiments, rather than slip covers that completely surround or encompass the faceplate/earpiece circumference, the slip cover may just cover the external surface of the faceplate/earpiece and secure/snap around the top and bottom of the faceplate/earpiece without covering the internal surface that is not typically seen when worn (e.g., a ¾ circumference slip cover).

Another embodiment of the invention relates to an eyewear system comprising components including:
  (a) a faceplate; and
  (b) a first arm and a second arm, each adapted to have one end connected to said faceplate; and
  (c) one or more decorative slipcovers attached to one or more components selected from said faceplate, said first arm, said second arm or combinations thereof, wherein said decorative slipcovers slide over and snap onto the eyewear system component.

According to one preferred embodiment, said slipcovers cover said first arm and said second arm. Alternatively, the system comprises means for reversibly slipcovering the eyewear components.

According to another preferred embodiment, said slipcovers cover a portion or all of said faceplate. Preferably, the slipcovers decorate or otherwise change the appearance of the outer portion of the eyewear (that is, the inner unseen portions need not be covered). Preferably, at least 50% of the surface of the eyewear component is covered, more preferably at least 75%, and most preferably at least 90% of the component. According to an alternative embodiment, the slipcover covers a portion of the component, e.g. a top portion of the faceplate as show in FIG. 8 to provide a desired decorative effect.

According to preferred embodiments, the slipcover comprises edges which are biased towards one another to effectuate a gripping force onto said component.

According to another preferred embodiment, the slipcovers are of a U-shape in cross-section having edges that include inwardly facing engaging portions that snap onto one side of said component to releasably attach the slipcover onto said component. Preferably, the bottom of said component comprises a longitudinal groove running along the bottom and said edges engage with said groove securing said decorative clips onto said component. Preferably, the slipcover flexes over one side of the component, slides over the component and secures as said engaging portions snap onto the other side of the component.

Figure 5G:
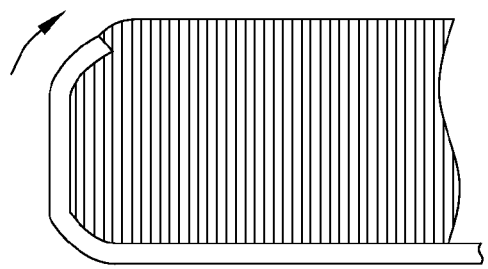
FIGS. 5E-5H are side cross-sectional views of a side arm and slip cover according to one embodiment of the invention.
Figure 5F:
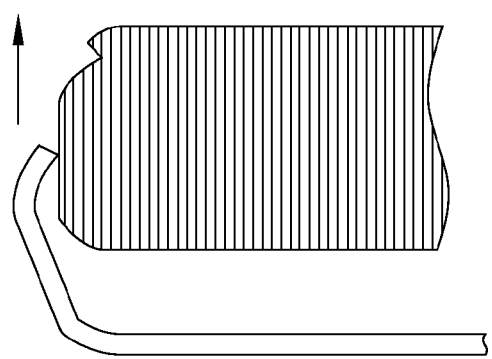
Figure 5H:
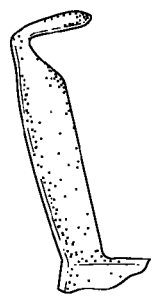
Figure 5E:
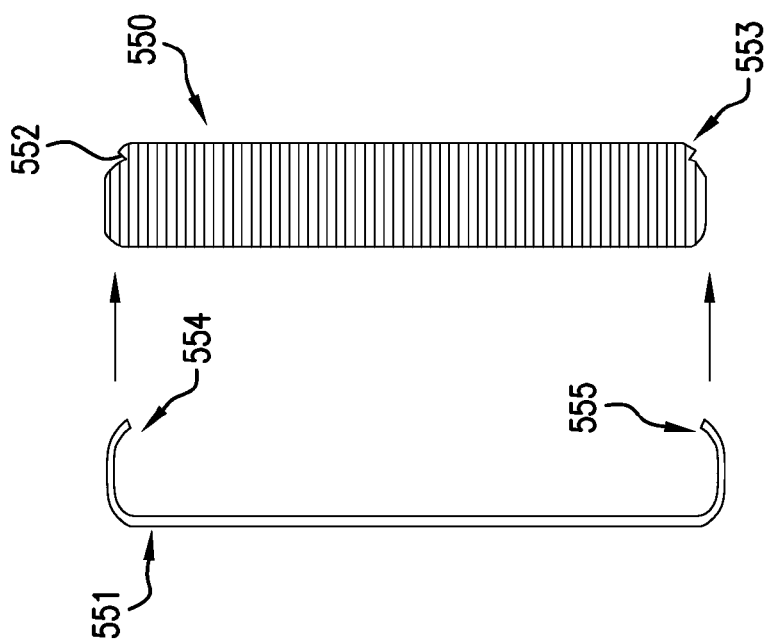

FIG. 5E is a side cross-sectional view of side arm 550 and slip cover 551 according to one preferred embodiment of the invention. Side arm 550 comprises groove 552 and groove 553 running along the length of side arm 550. Slip cover 551 comprises engaging portions 554 and 555 wherein one or both flex open to snap onto side arm 550 and engage groove 552 and groove 553, respectively. Preferably, engaging portions 554 and 555 and engaging groove 552 and groove 553 are at same height relative to the height of side arm 550, preferably approximately 0.020 inches less than the height or thickness of side arm 550 as shown in FIG. 5E requiring engaging portions 554 and 555 to flex open to snap onto side arm 550. FIG. 5F shows engaging portion 554 flexing open to slip onto side arm 550 (step A) while FIG. 5G shows engaging portion 554 closing around side arm 550 and engaging groove 552 (step B). Preferably, when slipcover 551 is fully attached to side arm 550, engaging portions 554 and 555 are hidden on the inner side of side arm 550. FIG. 5H shows side arm 550 with slipcover 551 attached.

According to another preferred embodiment, the slipcover comprises flexible plastic, metal or combinations thereof.

According to another preferred embodiment, the slipcover comprises a channel-like shaped decorative member having parallel sides with a pair of edges biased towards one another to effectuate its gripping onto said component.

According to another preferred embodiment, the slipcover covers the outwardly facing sides of the component but does not cover the inner side.

According to another preferred embodiment, the slipcover covers the top, bottom and outer surface of the component.

According to another preferred embodiment, the slipcover has sides having a thickness between 0.01 mm and 1 mm.

According to another preferred embodiment, the slipcover is releasably attached to permit the appearance of said eyewear system to be changed.

According to another preferred embodiment, the slipcovers are made of flexible material plastic.

According to another preferred embodiment, the slipcover cover all or a portion of the arms and/or the faceplate.

Another embodiment of the invention relates to a decorative slip cover for decorating eyewear comprising a length corresponding to the length of the eyewear component being decorated and a U-shape cross-section having edges that include inwardly facing engaging portions that snap onto one side of said component to releasably attach the slipcover onto said component thereby decorating the component. Yet another embodiment of the invention relates to a kit comprising, in one or more containers, an eyewear decoration system including:

(a) a first decorative slipcover for a faceplate;
(b) a second decorative slipcover for a left arm; and
(c) a third decorative slipcover for a right arm;

wherein each slipcover comprises one or more slipcovers as described above. For example a young girl princess slipcover kit might include a faceplate slipcover with a tiara theme decorated with synthetic crystals and pink earpiece slipcovers with shiny crown graphic at the temple.

Preferably, the kit further comprises a decorative nose bridge fastener.

According to other embodiments, the slipcovers can be packaged and sold separately, preferably with sizing or related information on the packaging to allow users to select the right slipcovers for their eyewear.

Yet another embodiment relates to innovative slipcover adaptors that can be added to conventional arms or eyewear frames to allow for the use of slipcovers. For example, a strip or additional component adapted to be attached (e.g., glued) onto an eyewear component to provide a grove to allow for the attachment of slipcovers according to the invention.

Figure 9:
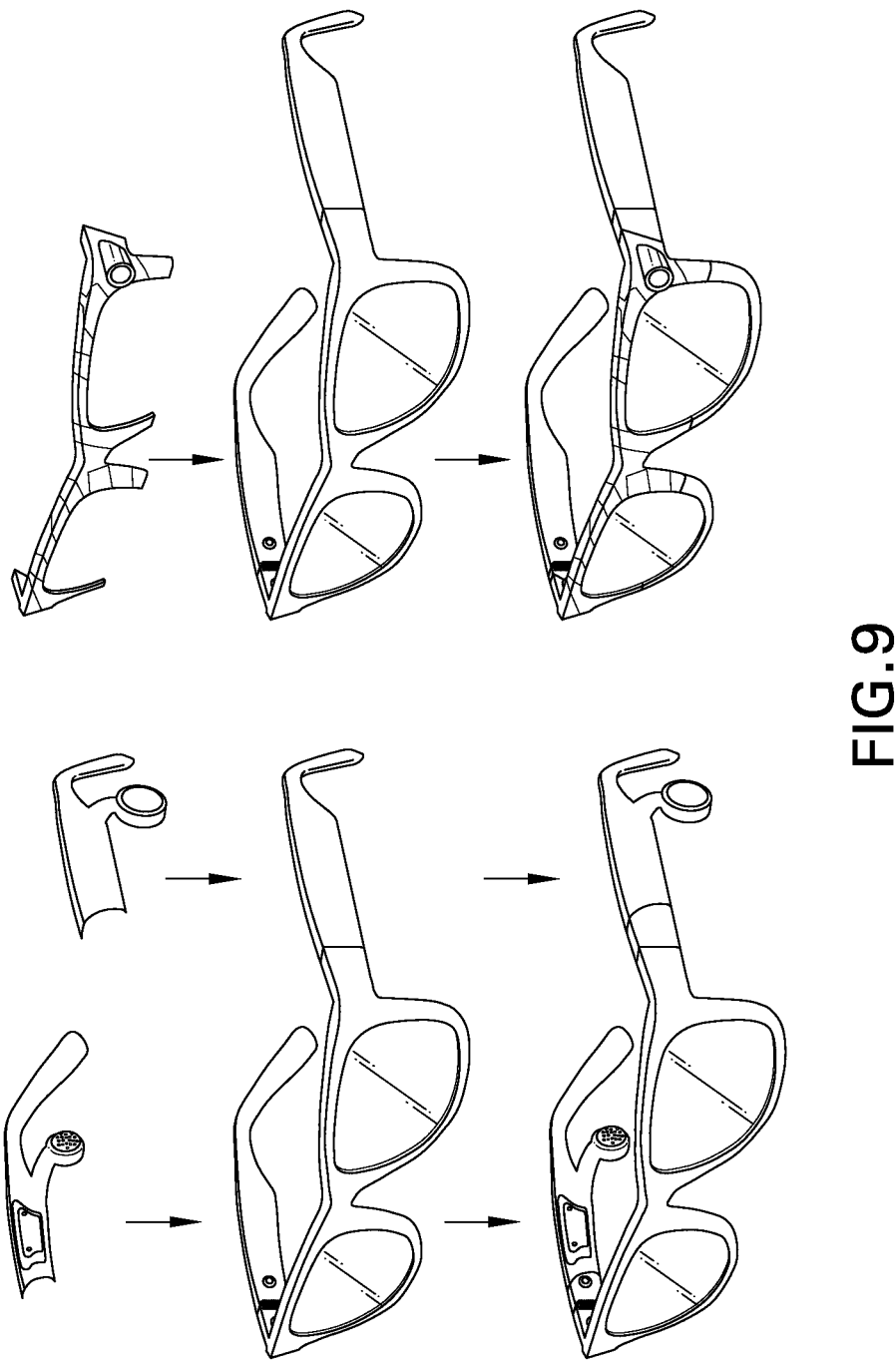
FIG. 9 provides embodiments of earpiece and faceplate attachment slipcovers employing the snap-on design of the invention allowing for the addition of mp3 players, earphones and/or mini video camera.

Another aspect of the invention relates to eyewear further comprising electronic components such as radio, headphones or earphones, cellphone, lighting, tv, camera, microphone or related electronics. According to one preferred embodiment, as shown in FIG. 9, functional components are attached to the eyewear using slipcovers on the arms or faceplate. According to another embodiment, functional components are attached to or integrated with the releasable hinge. Functional components may include mp3 players, speakers, earphones, Bluetooth, phone, mini-video, mini-camera, light, diagnostic device, batteries or other power sources, etc. As shown in FIG. 8, functional components may include custom or theme elements to transform the eyewear with a sculpted theme which may have integrated electronic or other components.

Yet another embodiment of the invention relates to a kit comprising, in one or more containers, an electronic/component integration system including:

(a) a faceplate, a first ear piece (e.g., left earpiece), a second earpiece (e.g., right earpiece) and two connecting hinges;
(b) a first electronic sensor slipcover for the faceplate;
(c) a second electronic sensor slipcover for the first earpiece;
(d) a third slipcover with an integrated power source for the second earpiece; and
(e) (optionally) additional component slip covers.

Preferably, said kit comprises one or more slipcovers as described above, more preferably two or more slipcovers. According to one preferred embodiment, the kits contains, in one or more containers, a faceplate and (b). According to another embodiment, an earpiece and (c) and/or (d).

Preferably, the kit is comprised of an eyewear framework (faceplate, two hinges, two ear pieces) and a tailored package consisting of one or more sensors, electronics, power sources, and other component slip covers that can be configured and re-configured rapidly and economically to meet a full range of requirements for a particular use, job or career field. For example, a crime scene investigator kit would comprise an eyewear framework and all component slip covers that could be integrated upon and within the eyewear framework and the componentized eyewear system as a whole can be configured or tailored to match the requirements of each particular crime scene immediately upon arrival at said scene. One can imagine an almost infinite number of both civilian and military applications where an integrated sensor, electronic, and/or component eyewear system would be useful in performing work while maintaining the freedom of movement of an individual's hands.

According to other embodiments, the component slipcovers can be packaged and sold separately, preferably with sizing or related information on the packaging to allow users to select the right slipcovers for their eyewear. For example, individual slipcovers with specified electronics or functionality sold individually to replace components or supplement or upgrade an existing eyewear systems features and functionality.

Another aspect of the invention relates to improved hinges for use in attaching the arms or templates to the faceplate.

U.S. Pat. No. 5,652,637, hereby incorporated by reference, discloses a springy pawl/button to lock the hinge, although does so differently and used only on one side of the hinge, not both. Disadvantages include the inability to easily release the arm from the hinge, the size and weight of the hinge and the inability to hide the hinge when assembled. According to certain preferred embodiments of the present invention, one-sided hinges are used that releasably attach to one component while being securely attached to a different component. For example, a one-sided hinge attached using screws to a faceplate but the other end of the hinge comprising releasably connecting structures, preferably including an elongated member with locking element and support members for releasably connecting to an earpiece arm. The advantages of a one-sided releasable hinge facilitate manufacture and results in eyewear with higher structural integrity, yet allows the eyewear components (frame and earpiece arms) to be readily changed.

Using the spring/button primarily as a latch mechanism and support rod or rods to provide rigidity allows for a much thinner faceplate/earpiece connection than is possible with a telescoping design. Additionally, the telescoping design causes an additional seam or connecting point in addition to the hinge that is not necessary with design of the present invention which results in a more professional/complete appearance.

Figure 3A:
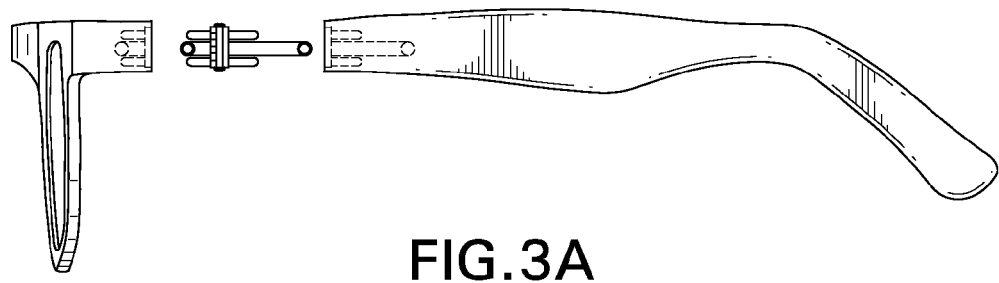
FIG. 3A is a side view of an unassembled eyewear system.
Figure 3B:
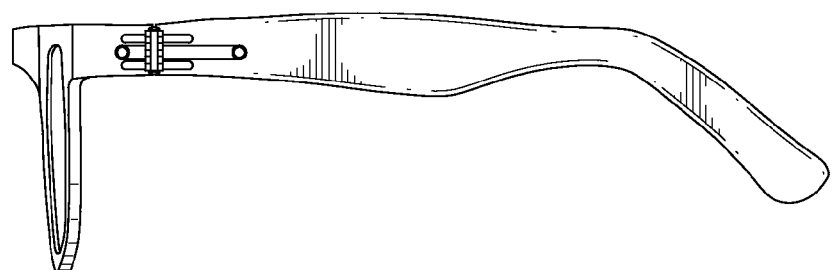
FIG. 3B is a side view of an assembled eyewear system.
Figure 3C:
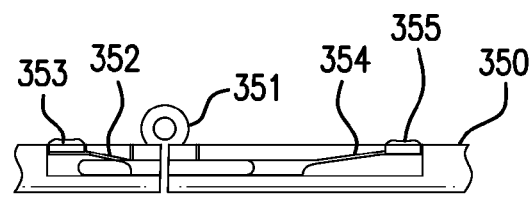
FIG. 3C is a side view of a detachable hinge assembly.
Figure 3D:
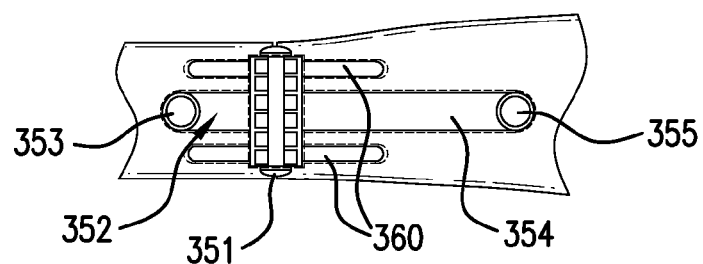
FIG. 3D is a top view of the detachable hinge assembly.

Referring to the figures, FIG. 3A is disassembled eye-wear system comprising a hinge assembly according to one embodiment of the invention, while FIG. 3B is an assembled version. FIG. 3C is a side view of a detachable hinge assembly 350 showing hinge pivot 351 and springy elongated member 352 with locking element 353 and springy elongated member 354 with locking element 355. FIG. 3D is a top view of the detachable hinge assembly 350 also showing support elements 360.

Preferably, the hinge is releasably connected to both the faceplate and the earpiece. That is, a springy arm can be pushed at either end of the hinge to release that end.

Preferably, the rigidity is provided when the springy arms are in locking position and all posts are resting in their respective slots.

Figure 11A:
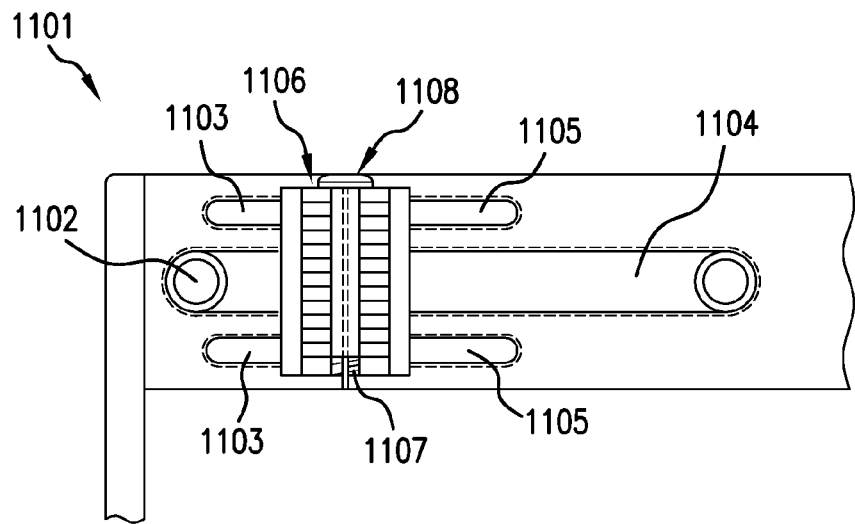
FIG. 11A is a top view of a hinge assembly according to another embodiment of the invention.

According to preferred embodiments, each side of the hinge assembly (faceplate and earpiece facing) is preferably custom designed and optimized to mate with different sizes, shapes, and thicknesses of faceplates and earpieces. Preferably, the round hinge pivots are standard in nature regardless of the springy arm and the support post configuration allows the inventive hinge to connect different faceplate/earpiece combinations in an optimal, structurally sound fashion. FIG. 11A is a top view of a hinge assembly 1101 according to another embodiment of the invention including a short elongated member 1102 with two supporting posts 1103 and long elongated member 1104 with two supporting posts 1105. The hinge ribs 1106 and threads 1107 for holding hinge pin 1108 also shown.

Figure 11B:
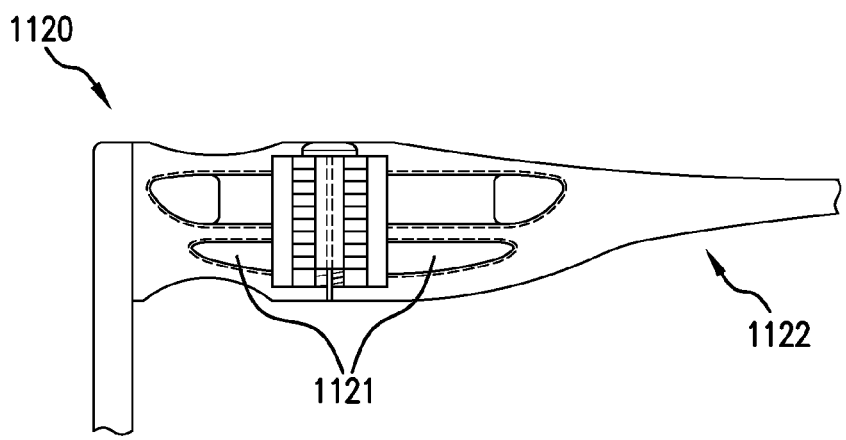
FIG. 11B is a top view of a hinge assembly according to another embodiment of the invention including contoured elements.

FIG. 11B is a view of a hinge assembly 1120 according to another embodiment of the invention including contoured elements 1121 to accommodate use in curve-shaped arm components 1122.

Figure 11C:
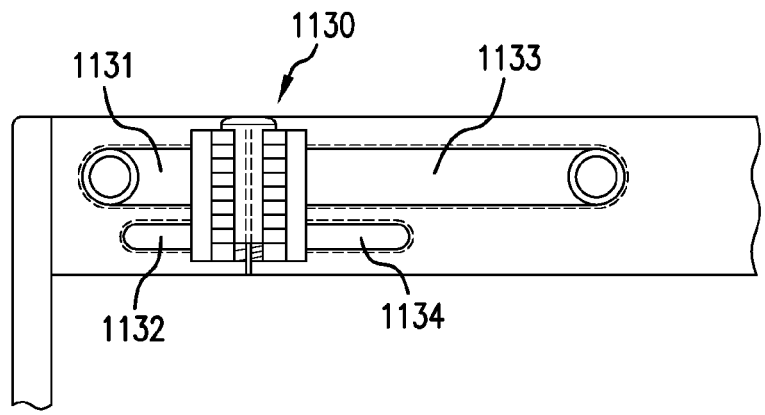
FIG. 11C is a top view of a hinge assembly according to another embodiment of the invention including a short elongated member and support post and a long elongated member and support post.

FIG. 11C is a top view of a hinge assembly 1130 according to another embodiment of the invention including a short elongated member 1131 and a single support post 1132 and a long elongated member 1133 and single support post 1134.

Figure 11E:
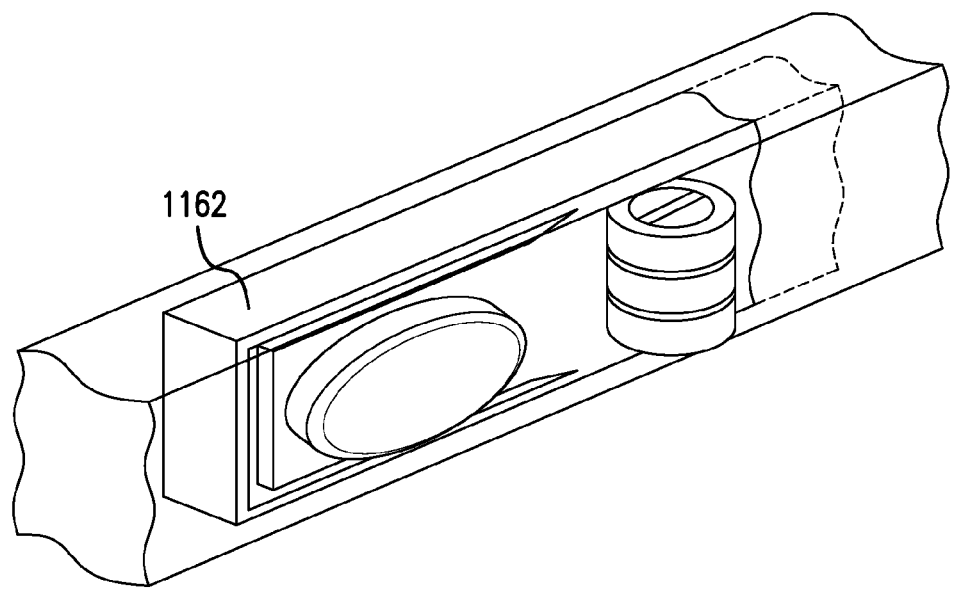
FIG. 11E shows a side view of a hinge assembly according to another embodiment of the invention including a supporting box-like structure encasing the elongated member.
Figure 11D:
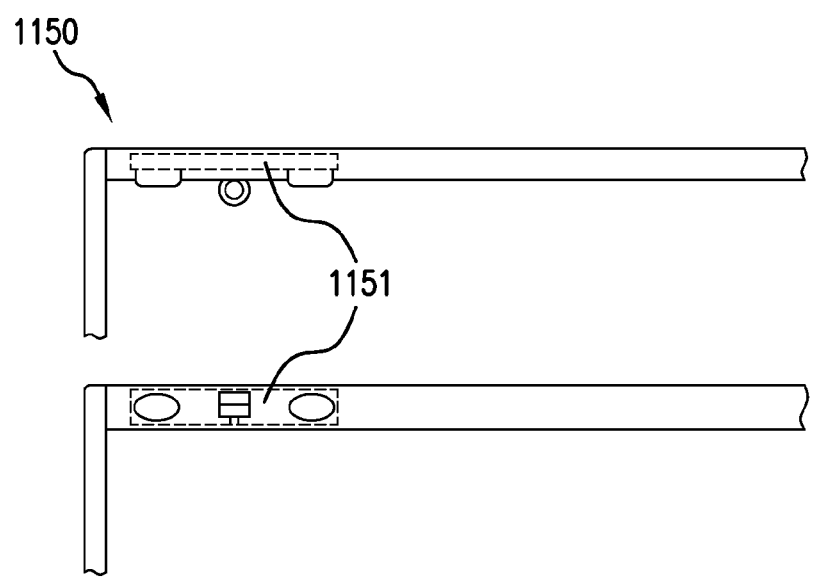
FIG. 11D shows a top view and side view of a hinge assembly according to another embodiment of the invention.

FIG. 11D shows a top view and side view of a hinge assembly 1150 according to another embodiment of the invention wherein the elongated member 1151 includes the supporting structure and thus can omit the support post(s).

FIG. 11E shows a side view of a hinge assembly according to another embodiment of the invention including supporting box-like 1162 structure encasing the elongated member. Alternatively, as described above, other embodiments of the invention use hinges which releasably attach to only one component (preferably the earpiece arm) while being secured to the other component (e.g., faceplate) using screws or other means.

According to one preferred embodiment, the hinge includes a thin bar all around, similar to a box design but only a thin wire around the button. Preferably, the hinge is designed to be narrow. Preferably, the hinge comprises metal (e.g., stainless steel), alloys, plastic, rubber, ceramic, bamboo, or other suitable material.

Preferred materials for use in the hinge would be stainless steel, preferably wherein the engaging button at the end of the springy arm may be either the same material, i.e. stainless steel, or different, i.e. plastic, or any smooth or lightly textured ridged material.

According to another preferred embodiment, the entire hinge assembly could be made of rigid plastic and, preferably be less costly compared to alternative materials.

Figure 10A:
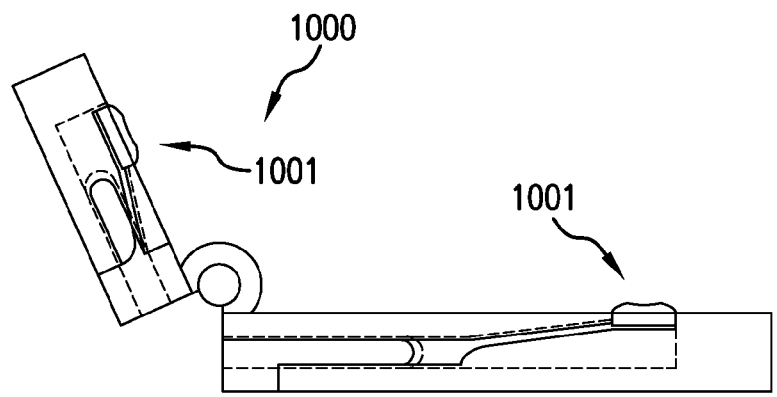
FIG. 10A is a side view of a bent hinge assembly according to one embodiment of the invention including inside-facing locking elements.
Figure 10B:
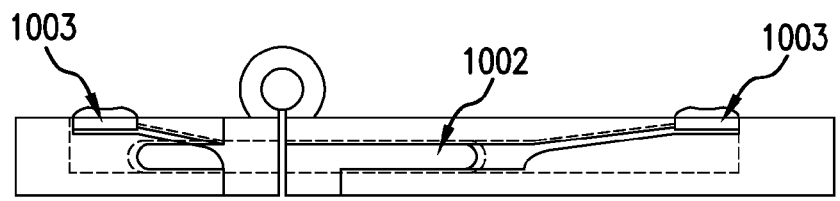
FIG. 10B is a side view of a hinge assembly according to another embodiment of the invention including inside-facing locking elements.
Figure 10C:
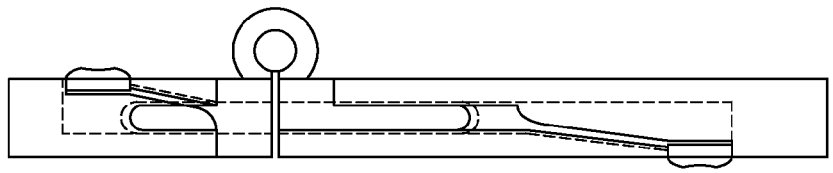
FIG. 10C is a side view of a hinge assembly according to another embodiment of the invention including an inside-facing locking element and an outwardly-facing locking element.
Figure 10D:
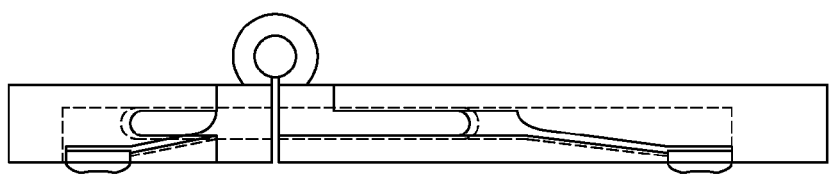
FIG. 10D is a side view of a hinge assembly according to another embodiment of the invention including outwardly-facing locking elements.

The button at the end of the springy arm and associated securing hole in the faceplate/earpiece can be either internal or externally facing and/or one internal facing and one external facing. FIG. 10A is a side view of a bent hinge assembly 1000 according to one embodiment of the invention including inside-facing locking elements 1001. FIG. 10B is a side view of a hinge assembly according to another embodiment of the invention including inside-facing locking elements 1003 and supporting pins 1002. FIG. 10C is a side view of a hinge assembly according to another embodiment of the invention including an inside-facing locking element and an outwardly-facing locking element. FIG. 10D is a side view of a hinge assembly according to another embodiment of the invention including outwardly-facing locking elements.

Figure 12A:
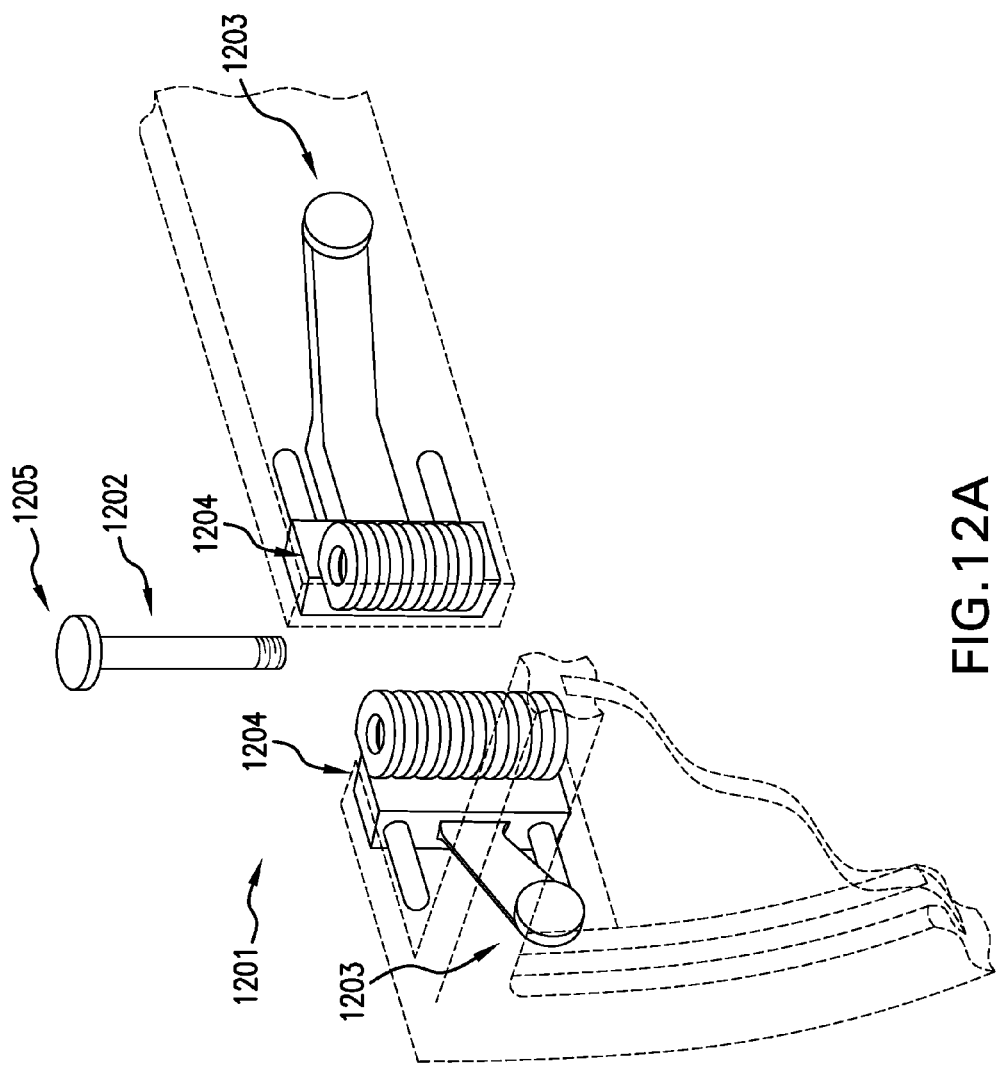
FIGS. 12A-12E show side views of hinge assemblies according to further embodiments of the invention including branding or decorations.
Figure 12B:
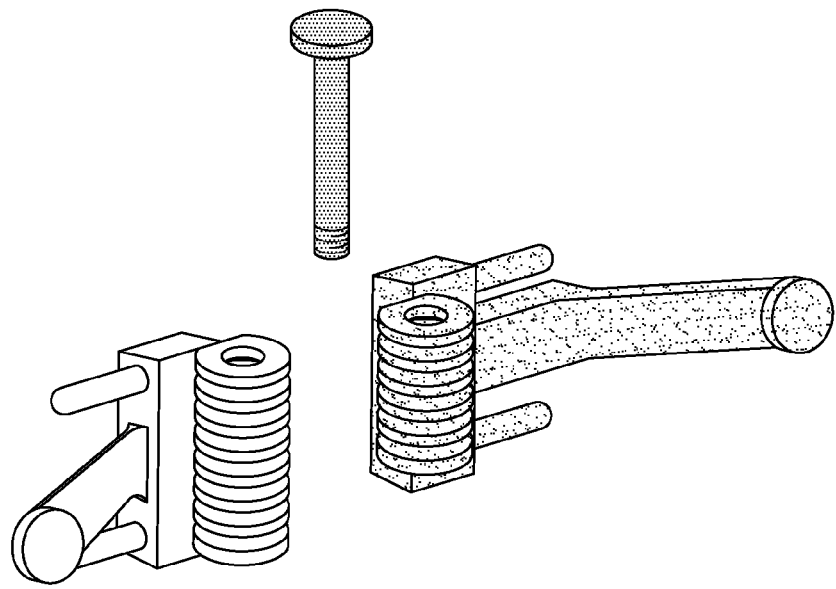
Figure 12C:
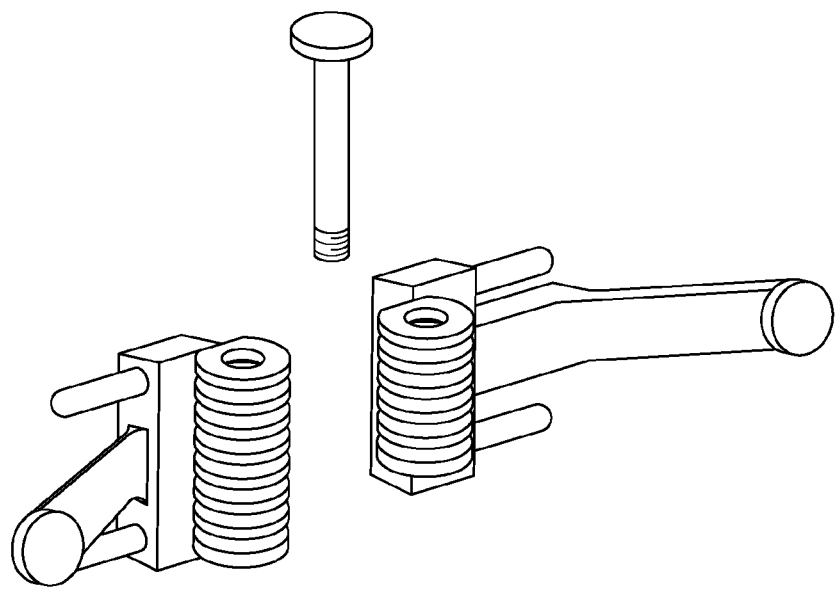
Figure 12D:
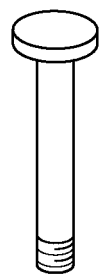
Figure 12E:
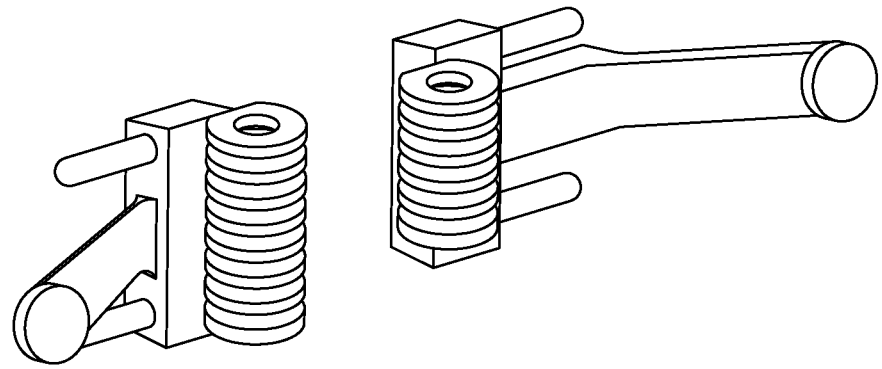

Additionally the springy arm button can be any shape, size, or color within the confines of the surface area of the faceplate/earpiece it is designed to mate with. In one embodiment, the hinge could include a colored springy arm button in the shape of a company logo that is externally facing when mated with the faceplate and a round, stainless steel internally facing springy arm button that connects to the earpiece. FIGS. 12A-12E show side views of hinge assemblies according to additional embodiments of the invention including branding, marketing or other decorations. FIG. 12A shows a hinge assembly 1201 with decals or designs on the top surface 1205 of the pin 1202, on the top surface of each locking button 1203 and on the hinge chassis face surfaces 1204. As shown in the drawing, the hinge assembly is configured so that each decal surface is visible when assembled with the eyewear components. FIG. 12B shows the hinge assembly of FIG. 12A as a three-color hinge assembly, while FIG. 12C shows the hinge in a single color. FIG. 12D shows a pivot pin having the top surface decorated. FIG. 12E shows the locking buttons and chassis face surfaces with decorations.

According to another preferred embodiment, two or more locking elements are used on one or both elongated members to increase the locking strength.

According to another preferred embodiment, two or more elongated members are used on one or both sides of the hinge. For example, three elongated members securing the hinge to the arm and two securing the hinge to the faceplate.

According to another embodiment, a hinge may be sold separately and is packaged with an indication of size or matching identification so that it can be used with a specific eyewear system.

There are several considerations for the size and shape of the springy arm and support posts for both the faceplate and earpiece facing. First consideration is that there is not as much room on the faceplate and the springy arm and the support posts must still support the weight of the earpiece/hinge. This fact typically necessitates a springy arm and support posts that are close to the same length (to provide for the greatest length possible for both the springy arm and support posts in the faceplate). The size, shape, length, and number of the springy arms and support posts can be optimized in relation to one another to ensure the best fit and structural rigidity possible in the smaller faceplate mating space. Second, in order to counter twisting or lever forces of the earpiece, preferred embodiments may require longer springy arm (preferably between 2 to 3 times the length of the faceplate springy arm) and slightly longer (5/6 to 3/4 ratio) between faceplate facing and earpiece facing support posts respectively. The key point is that the size, shape, length, and number of both faceplate facing and earpiece connecting surfaces can be customized and optimized to a large number of faceplate/earpiece combinations.

For stiffness, the hinge preferably comprises stainless steel, plastic or other rigid material. Stiffness can also be controlled by size, shape and length as described above. Additionally, more or fewer support posts can be used depending on the characteristics of the earpiece/faceplates to be connected. For example, for a narrow earpiece there may be a longer springy arm and only one longer support post. For a wide earpiece there could be a wider springy arm and 4 narrower cylindrical support posts or two wider I-beam shaped support posts, whatever configuration of both faceplate/earpiece connecting arms and posts are required to optimize the strength and rigidity of the faceplate/earpiece combination to be connected.

Thus, another embodiment of the invention relates to an eyewear system comprising:
(a) a faceplate;
(b) a first detachable arm and a second detachable arm, each adapted to have one end connected to said faceplate; and
(c) a first hinge attaching said first detachable arm to said faceplate and a second hinge attaching said second detachable arm to said faceplate,
wherein said first hinge and said second hinge each comprise an elongated member interfitting into an opening in said faceplate thereby securing the hinge to the faceplate, each elongated member having a locking element disposed on the free end thereof and wherein when each elongated member is inserted into each opening within said faceplate the locking element locks into a depression or through-hole disposed in the inner or outer wall of the opening thereby securing the hinge to the faceplate.

Preferably, the elongated member is an axial finger having the locking element disposed on the free end thereof.

Alternatively, the hinge comprises a push pin or other means for reversibly locking the hinge to the eyewear component (e.g., faceplate or earpiece). According to another embodiment, the hinge comprises two or more locks or locking means for reversibly locking to said components.

According to one preferred embodiment, the elongated member comprises a spring-biased element and when inserted into the opening the spring-biased element forces the locking element into a locking position with the depression or through-hole.

Accordingly to another preferred embodiment, the hinge may be unlocked by pushing the locking element using a finger or pointed element to push the locking element far enough so that the locking element does not lockingly engage said depression or through-hole.

Preferably, the locking element has the shape of a ball, a button, a piston, a dome, a rectangular element or any other shape.

According to another preferred embodiment, the first hinge and said second hinge each further comprise a second elongated member interfitting into an opening within each detachable arm securing said detachable arm to said hinge and thereby detachably securing said detachable arms to said faceplate. Preferably, the length of said second elongated member ranges from the same length as the first elongated member to four times the length. More preferably, the length of said second elongated member ranges from two times the length to three times the length as the first elongated member.

According to another preferred embodiment, said first hinge and said second hinge comprise at least one support member alongside said elongated member to provide additional support.

According to another preferred embodiment, said first hinge and said second hinge comprise a support member on each side of said elongated member to provide additional support.

According to another preferred embodiment, said first hinge and said second hinge comprise at least two support members alongside said elongated member to provide additional support. Preferably, wherein each support member mates with a matching opening within said faceplate.

According to another preferred embodiment, said elongated member extends its free end first into said opening.

According to another preferred embodiment, the hinge is metallic or plastic, although other suitable materials may be used. Preferably, the hinge comprises stainless steel.

According to another preferred embodiment, each hinge comprises said elongated members on each side of the hinge, support members on each side of said elongated members and a pivoting pin system between said elongated members allowing said elongated members to pivot relative to each other.

According to another preferred embodiment, each hinge is substantially invisible when said eyewear system is assembled.

Another embodiment of the invention relates to an eyewear system comprising:
(a) a faceplate; and
(b) a left arm and a right arm;
wherein each arm is connected to said faceplate using a hinge comprising a first pin push down locking system to connect said hinge to said faceplate and a second pin push down locking system to connect said hinge to said arm.

Yet another embodiment relates to an eyewear system comprising:

(a) a faceplate assembly including two or more pieces and one or two lenses,
(b) two ear piece members and
(c) two hinges which attach and detach from both the faceplate assembly and the ear piece members, wherein said hinges comprise a pin push down locking system at each end of the hinge.

Preferably, the hinge is not part of either the faceplate or the arms and is preferably detachable from either or both. That is, the hinge is releasably connected to both the faceplate and the ear piece. Alternatively, according to other embodiments, the hinge is connected to one component and detachably connected to the other, for example, one side of the hinge connecting to either the faceplate or earpiece arm connecting directly to hinge loops or other releasably connection means. Preferably, rigidity is provided when the springy arms are in locking position and supporting post or posts are resting in their respective slots.

According to one preferred embodiment, the hinge assembly is comprised of three components including (i) a faceplate mating component, (ii) an earpiece mating component, and (iii) screw or pin that connects the two. The mating components contain both spring/button connectors and support rods and can have different sizes, shapes, or numbers of each allowing the hinge to act as an adapter to connect any number of different sizes/shapes/styles of faceplate/earpiece combinations. In addition or using the spring/button primarily as a latch mechanism and support rods to provide rigidity you can provide for a much thinner faceplate/earpiece connection than is possible with the telescoping design. Additionally the telescoping design causes an additional seam or connecting point in addition to the hinge that is not necessary with preferred designs and results in a more professional/complete appearance.

Preferably, the hinge assemblies of the invention comprise a one or two sided hinge with quick-release pin design. That is, each end of the hinge may comprise the quick-release pin mechanism or only one side of the hinge.

Figure 13A:
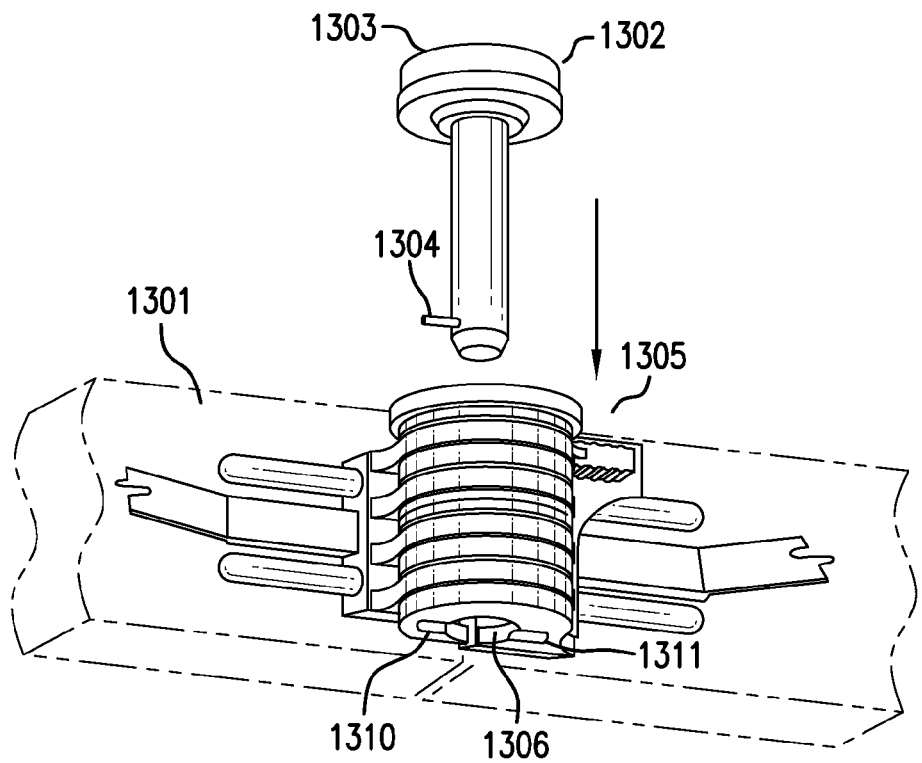
FIG. 13A is a side view of a hinge assembly according to another embodiment of the invention including a quick release pin design.
Figure 13B:
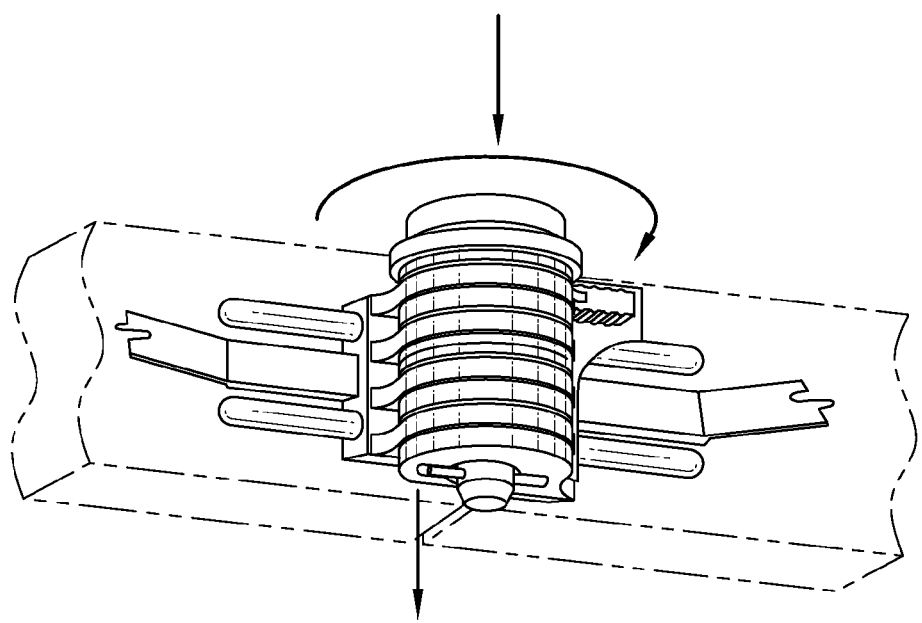
FIG. 13B is a side view of the hinge assembly of FIG. 13A with the pin inserted.
Figure 13C:
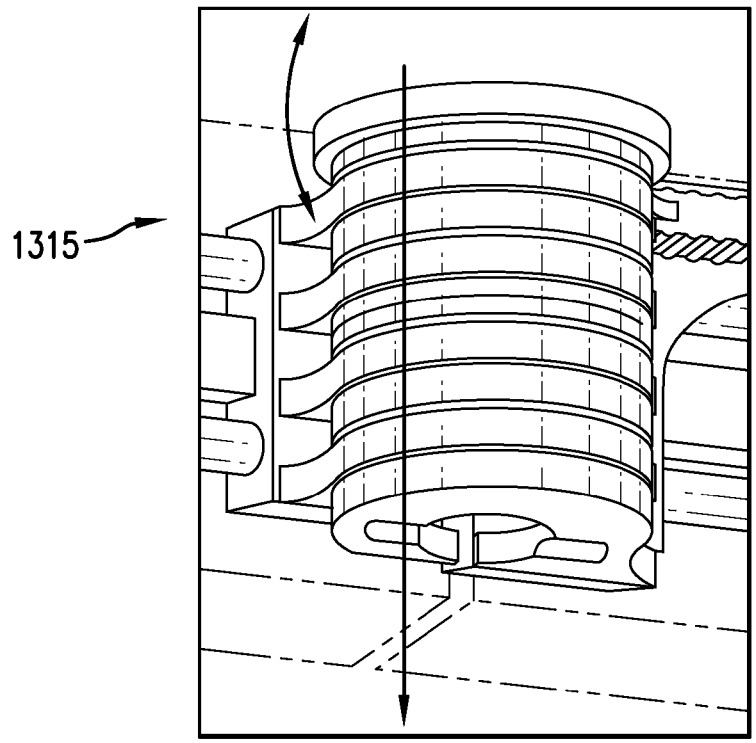
FIG. 13C is an exploded view of the hinge assembly of FIG. 13A.
Figure 13D:
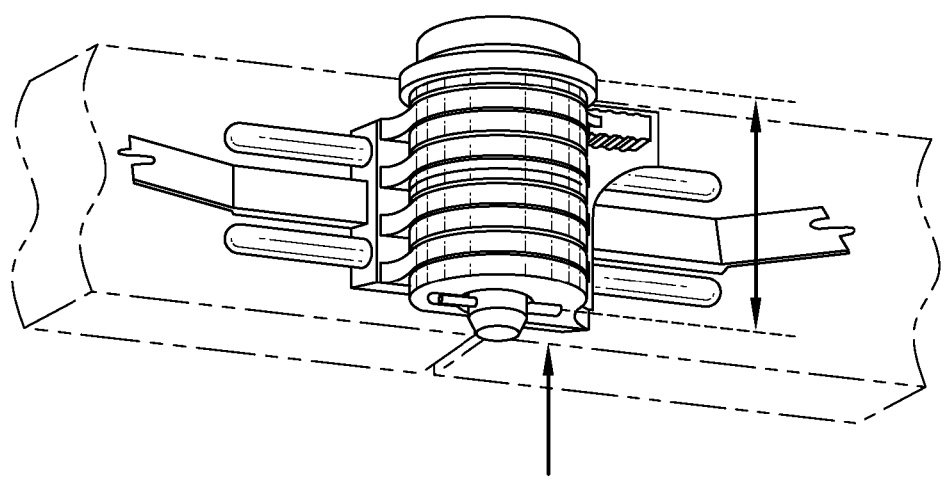
FIG. 13D is a side view of the hinge assembly of FIG. 13A with the pin inserted and turned to locking position.

Accordingly, yet another embodiment of the invention relates to a hinge assembly using a quick-release pin design that allows the pivot pin to be easily inserted and locked and unlocked and removed easily without the use of tools. The quick release pin reversibly secures the hinge ribs and threads thereby detachably securing different combinations of arms and faceplates. Preferably, the quick release pin releasably locks by a simple push and twist mechanism. FIG. 13A is a side view of a hinge assembly 1301 according to another embodiment of the invention including a quick release pin design showing un-inserted hinge push pin 1302 comprising a twist handle 1303 and locking tab 1304 and the hinge assembly structure 1305 including hinge pin opening 1306 and a tab through-slot 1310 and tab locking detent 1311. Step 1 includes pushing pin 1302 into opening 1306. FIG. 13B is a side view of the hinge assembly of FIG. 13A with the pin 1302 inserted so that tab 1304 passes through through-slot 1310 wherein Step 2 comprises twisting said pin 1302 to rotate 180 degrees while pushing down on the pin. FIG. 13C is an exploded view of the hinge assembly of FIG. 13A showing through-slot 1310 running through the pin opening 1306 and tab locking detent 1311 and also showing a flexible top portion 1315 of pin 1302 which acts like a spring to provide pressure on the tab 1304 when positioned to rest in detent 1311. FIG. 13D is a side view of the hinge assembly of FIG. 13A with the pin inserted and turned to a locking position whereby expansion pressure generated by the compressed flexible top portion 1315 keeps the pin in place. Using the simple quick release pin design, the eyewear templates and faceplate can be easily removed and re-attached.

Additionally, different faceplate facing and earpiece facing hinge components can be changed with each other or standard hinge rings on either side (faceplate or earpiece) and secured with a quick release pin to securely attach different faceplate and earpiece combinations in a structurally sound fashion. According to preferred embodiments, the hinges comprise metal (e.g., stainless steel), plastic, alloys, rubber, ceramics, etc.

Yet another embodiment of the invention relates to eyewear systems comprising releasable nose bridge fasteners to releasably attach the left lens holder to the right lens holder to form the faceplate. Preferably, the nose bridge can become a fastener that slides onto the same grooves of the faceplate covers and locks them easily and securely into place, the nose bridge is also easily removable as shown in FIGS. 2B and 2E.

One embodiment of the invention relates to an eyewear system comprising:
(a) a left lens holder attached to a left ear piece member;
(b) a right lens holder attached to a right ear piece member;
(c) nose bridge releasably connecting said left lens holder and said right lens holder, wherein a first side of said nose bridge is configured to releasably snap onto said left lens holder and a second side of said nose bridge is configured to releasably snap onto said right lens holder thereby connecting said left lens holder and said right lens holder.

Preferably, the nose bridge has an H-like or butterfly-like or tooth-like shape with a left side connecting to said left lens holder and a right side connecting to said right lens holder.

Preferably, as shown in FIGS. 2H and 2I, the nose bridge fastener comprises one or more U-shaped channels or grooves 231 along the sides of said nose bridge that slide onto or snap onto said left lens holder and said right lens holder by sliding and snapping onto portions of said lens holders.

Preferably, the nose bridge is made of plastic and comprises reinforcing metallic elements.

According to one preferred embodiment, the nose bridge is co-molded with said metallic elements, preferably steel arms.

According to another embodiment, the nose bridge becomes a fastener that slides onto grooves of the lens holders and locks them easily and securely into place forming a faceplate. Preferably, the nose bridge is easily removable.

According to another embodiment, the nose bridge contains a portion or space between the right and left lens holder grooves of varying width that acts as a spacer to spread wider apart the right and left lens holders to accommodate wider heads while still providing a structurally sound, smooth and professional appearance to the faceplate assembly.

According to another embodiment, the eyewear system comprises means for reversibly fastening said faceplate components to form the faceplate, preferably, means for reversibly snap-fastening the components.

Another aspect of the invention relate to eyewear systems allowing for interchangeable lens.

One embodiment of the invention relates to an eyewear system comprising interchangeable lenses comprising:
(a) a faceplate including a left lens holder and a right lens holder;
(b) a left lens held within said left lens holder and a right lens held within said right lens holder; and
(c) a left inner frame and a right inner frame detachably attached to said outer frame thereby securing said left lens to said left lens holder and said right lens to said right lens holder; wherein said left inner frame and said right inner frame attach to said faceplate by dove tail matching grooves or any other connecting surface between said faceplate and said left inner frame and said right inner frame.

Preferably, the faceplate comprises two or more pieces, as show in FIG. 2A. According to another preferred embodiment the faceplate comprises a left half and a right half attached using a nose bridge, preferably releasably attached by a nose bridge.

Another embodiment of the invention relates to an eyewear system comprising interchangeable lens comprising
 (a) a faceplate including a left lens holder and a right lens holder;
 (b) a left lens held within said left lens holder and a right lens held within said right lens holder; and
 (c) a left inner frame and a right inner frame detachably attached to said outer frame thereby securing said left lens to said left lens holder and said right lens to said right lens holder; wherein said left inner frame and said right inner frame snap into said faceplate securing said left and right lens.

Preferably, the back lens cover slides onto the faceplate assembly using dove tail grooves or other connecting surface and can be held securely in place and can be supported everywhere.

Preferably, the back of each lens frame comprises a groove around the inside of each lens frame for holding the lens wherein each lens snaps or is held into place on said lens frame.

Preferable, the system further comprises a locking frames that secures onto each lens frame for securing said lens.

According to one preferred embodiment, the front faceplate and back cover(s) are attached using interlocking dovetail grooves.

Preferably, the dove tail grooves are as small, shallow and as few as possible while still providing appropriate angles for the slip covers to hold/secure.

Preferably, the dove tail grooves are, or connecting surface is, also hidden from view where possible on the bottom or inside surface of the faceplate/earpieces.

Additionally, preferably, the edges of the slipcover that snap into the dove tail grooves are angled in relation to each other to form the thinnest seam possible when snapped into the dove tail grooves. There is also preferably a small, inconspicuous fingernail sized opening between the slipcover edges when aligned within the dovetail grove to allow for its easy removal.

Preferably, the eyewear comprises a main frame and one or more back lens covers.

According to another preferred embodiment, the main frame comprises two lens holders, each in the form of a lens opening for holding the lens, and preferably further comprise back lens covers that secure said lens to said main frame. Preferably, a pair of temple arms are hingedly assembled to the main frame.

Preferably, the eyewear comprises a sufficiently smooth surface to resist moisture and can be easily wiped clean.

Preferably, the invention allows users to easily replace or exchange lens with other lens. For example, changing the Rx prescription or changing from sunglass lens to nighttime lens or changing the colors or shades, etc.

Yet another embodiment of the invention relates to a kit comprising, in one or more containers, multiple lens for changing the function and appearance of a componentized eyewear system including:
 (a) a faceplate including a left lens holder and a right lens holder;
 (b) multiple different left lens held within said left lens holder and multiple different right lens held within said right lens holder; and
 (c) a left inner frame and a right inner frame detachably attached to said outer frame thereby securing said left lenses to said left lens holder and said right lenses to said right lens holder.

Preferably, wherein said left and right lenses can be mixed and matched in any combination to change the functionality and/or appearance of the eyewear system. For example, functionality of the eyewear system can be changed by switching between lenses of different prescription strengths or from prescription lenses to nonprescription lenses. Different shades of sunglass lenses with different UV protection levels can be changed based on the environment and/or weather conditions encountered. Changes between sunglass lenses, yellow shooting lenses, and clear lenses can be accomplished to allow for rapid and repeated modification of the eyewear system to optimally support different activities. Appearances of the eyewear system can be rapidly and repeatedly changed by switching left and right lenses together or independently in any color, quality or finish combination.

According to other embodiments, the lens kits can be packaged and sold separately, preferably with sizing, functional or related information on the packaging to allow users to select the correct lenses for their eyewear system.

Another embodiment relates to componentized eyeglass/sunglasses/slipcover system (System) that facilitates quick and easy transformation of the System for decorative/style changes and the attachment of electronic or other integrated components, the System will comprise of: a face plate assembly consisting of two or more pieces plus one or two lenses, two ear piece members and two hinges which attach and detach from both the face plate assembly and the ear piece members and slipcovers that are made of any flexible material plastic or otherwise that will cover all or a portion of the ear piece members and/or the face plate assembly, the faceplate assembly is comprised of a front and back cover, one or more lenses, when the faceplate assembly and earpiece are connected to the hinge, the earpieces are moveable and can be opened and/or closed.

Preferably, the faceplate assembly is comprised of a front and back cover and one or more lenses. According to preferred embodiments, the front cover and one or more lenses fit together and the back cover slides into place securing the faceplate assembly that is also easily removable.

According to another embodiment, the nose bridge becomes a fastener that slides onto the same grooves of the faceplate covers and locks them easily and securely into place, the nose bridge is also easily removable.

Preferably, the movable portion is configured with the hinge to detach from the static portion for easy decorative or electronic replacements.

Preferably, the hinge attaches securely and can be easily removed from both the faceplate assembly and/or the earpieces.

Preferably, the slipcovers are made of any flexible material plastic or other material that will cover all or a portion of the ear piece members and/or the face plate assembly and preferably the slipcovers are for decorative/style changes as well as for attaching/integrating electronic or other components.

Preferably, the cover attached to the earpiece snaps into the groove running along the bottom or inside edge of the earpiece. For example, the slipcover flexes over the top of the arm and slides over or around it and securing in the groove. Additionally, earpiece slipcovers can easily be removed.

According to another embodiment, the covers are tube or sock-like and configured to slide over or wrap around in any fashion to the component.

According to another embodiment, the covers are attached or secured to the eyewear component using the male/female connectors described above.

According to yet another embodiments, the covers are attached or secured to the eyewear components using magnets or adhesives.

According to yet another embodiment, the covers are attached or secured using springy arms which securely snap onto the component.

Preferably, the covers are easily and repeatedly removed or exchanged.

According to another preferred embodiment, the slipcover is attached to the faceplate assembly, held securely in place and is supported everywhere, additionally the face plate slipcovers can easily be removed.

While the particular systems, components, methods, and devices described herein and described in detail are fully capable of attaining the above-described objects and advantages of the invention, it is to be understood that these are the presently preferred embodiments of the invention and are thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "one or more" and not "one and only one", unless otherwise so recited in the claim.

It will be appreciated that modifications and variations of the invention are covered by the above teachings and within the purview of the appended claims without departing from the spirit and intended scope of the invention.

What is claimed is:

1. An eyewear system comprising components including:
   (a) a faceplate;
   (b) a first arm and a second arm, each adapted to have one end connected to said faceplate; and
   (c) one or more decorative slipcovers attached to one or more components selected from said first arm and said second arm, wherein said slipcovers slide over, wrap around, or adhere to the eyewear system component and comprise edges or arms which are biased towards one another to effectuate a gripping force onto said component to releasably attach the slipcover onto said component and cover said first arm and said second arm thereby decorating the component and wherein said slipcovers comprise a length corresponding to the length of the component and wherein said decorative slipcover does not change the overall shape of the component and said slipcover covers the external surface of the component without covering the internal surface that is not typically seen when worn and wherein at least 50% of the surface of the component is covered with said slipcover.

2. The eyewear system of claim 1, wherein said slipcovers are made of a flexible, elastic, soft, stretchy material.

3. The eyewear system of claim 1, wherein said slipcovers are made of a material selected from the group consisting of rubber, plastic, elastic, metal, or any combination thereof.

4. The eyewear system of claim 1, wherein said system further comprises slipcovers to cover a portion or all of said faceplate.

5. The eyewear system of claim 1, wherein said slipcovers are U-shape in cross-section having said edges which effectuate a gripping force onto said component.

6. The eyewear system of claim 1, wherein said slipcover has integrated electronic or other devices that can releasably attach the slipcover and integrated device onto said eyewear component thereby changing, altering or improving the functionality of the component.

7. The method of claim 1, wherein said one or more decorative slipcovers do not change the overall shape of the faceplate, first arm or second arm.

8. A decorative slipcover for decorating eyewear comprising a length corresponding to the length of the eyewear component being decorated and having edges that include inwardly facing engaging portions or is formed in the shape of a tube that adheres to, snaps onto, wraps around or slides over one side of said component to releasably attach the slipcover onto said component thereby decorating the component and wherein said decorative slipcover does not change the overall shape of the component and said slipcover fits exactly and snuggly onto the eyewear component and covers the external surface of the component without covering the internal surface that is not typically seen when worn and wherein at least 50% of the surface of the component is covered with said slipcover and said component is an ear piece member for a conventional eyewear frame.

9. A kit comprising, in one or more containers, an eyewear decoration system including:
   (a) a first decorative slipcover for a faceplate;
   (b) a second decorative slipcover for a left arm; and
   (c) a third decorative slipcover for a right arm;
wherein each slipcover (b) and (c) comprising the slipcover of claim 8.

10. The kit of claim 9, further comprising a decorative nose bridge fastener to decorate the center nose bridge portion of the faceplate and securely and releasably attach separate or different right and left faceplate components and wherein said nose bridge fastener comprises one or more U-shaped channels or grooves along the sides.

11. A method of modifying conventional eyeglasses comprising securely mounting the slipcover of claim 8 onto a component of said eyeglasses resulting in a quick and easy transformation of said eyeglasses.

12. The method of claim 11, wherein said slipcover does not change the overall shape of the eyeglasses and fit exactly and snuggly around said component.

13. An eyewear system comprising components including:
   (a) a faceplate;
   (b) a first arm and a second arm, each adapted to have one end connected to said faceplate forming ear piece members; and
   (c) one or more decorative slipcovers attached to one or more components selected from said first arm and said second arm, wherein said slipcovers slide over, wrap around, or adhere to the eyewear system component with engaging or gripping portions and wherein said slipcovers are made of a flexible material having a thickness between 0.01 mm and 1 mm and a length corresponding to the length of the component and said slipcovers selectively modify or personalize a user's conventional eyeglasses comprising said faceplate, first arm and second arm and are securely mounted on said eyeglasses when worn and said slipcovers mates to said component thereby decorating the component and said slipcovers do not change the overall shape of the component and said slipcovers cover the external surface of the component without covering the internal surface that is not typically seen when worn and wherein at least 50% of the surface of the component is covered with said slipcover.

14. The system of claim 13, wherein said slipcovers are made of a stretchy soft rubber material.

15. An eyewear system comprising components including:
(a) a faceplate;
(b) a first arm and a second arm, each adapted to have one end connected to said faceplate forming ear piece members; and
(c) one or more decorative slipcovers attached to one or more components selected from said first arm and said second arm, wherein said slipcovers slide over, wrap around, or adhere to the eyewear system component and wherein said slipcovers are made of a flexible material having a thickness between 0.01 mm and 1 mm and a length corresponding to the length of the component and are custom molded to fit exactly and snuggly around said component and said slipcovers selectively modify or personalize a user's eyeglasses comprising said faceplate, first arm and second arm and are securely mounted on said eyeglasses when worn and wherein at least 50% of the surface of the component is covered with said slipcover and said slipcovers have a U-shape in cross-section having said edges which effectuate a gripping force onto said component.

16. The system of claim 15, wherein said slipcovers are made of flexible plastic.

17. An eyewear system comprising components including:
(a) a faceplate;
(b) a first arm and a second arm, each adapted to have one end connected to said faceplate forming ear piece members; and
(c) one or more decorative slipcovers attached to said faceplate, said first arm, and said second arm, wherein said slipcovers slide over, wrap around, or adhere to said eyewear system components and wherein said slipcovers are made of a soft flexible material having a thickness between 0.01 mm and 1 mm and a length corresponding to the length of the component or any portion thereof and said slipcovers selectively modify or personalize conventional eyeglasses comprising said faceplate, first arm and second arm and are securely mounted on said eyeglasses when worn and said slipcovers have a U-shape in cross-section and mate to said component with engaging or gripping portions and does not change the overall shape of the eyeglasses and fit exactly and snuggly around said component.

18. The system of claim 17, wherein said slipcovers are made of a flexible metal.

* * * * *